(12) United States Patent
Watanabe et al.

(10) Patent No.: US 7,320,846 B2
(45) Date of Patent: Jan. 22, 2008

(54) BIPOLAR BATTERY AND METHOD FOR MANUFACTURING THE SAME

(75) Inventors: Kyoichi Watanabe, Yokosuka (JP); Kenji Hosaka, Yokosuka (JP); Kouichi Nemoto, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 394 days.

(21) Appl. No.: 10/833,058

(22) Filed: Apr. 28, 2004

(65) Prior Publication Data

US 2004/0253512 A1    Dec. 16, 2004

(30) Foreign Application Priority Data

Jun. 12, 2003   (JP)   ............ P2003-168213

(51) Int. Cl.
*H01M 10/18* (2006.01)
*H01M 6/48* (2006.01)
*H01M 2/08* (2006.01)

(52) U.S. Cl. ............. 429/210; 429/185; 429/208; 429/231.8; 429/233; 29/623.2; 29/623.3; 29/623.4

(58) Field of Classification Search ............ 429/210
See application file for complete search history.

(56) References Cited

U.S. PATENT DOCUMENTS

2003/0194605 A1 * 10/2003 Fauteux et al. ............ 429/149

2005/0069768 A1    3/2005 Sebastien et al.

FOREIGN PATENT DOCUMENTS

| EP | 0 935 265 A2 | | 8/1999 |
|---|---|---|---|
| FR | 2 195 853 | | 3/1974 |
| FR | 2 832 859 | | 5/2003 |
| JP | 05-13061 | | 1/1993 |
| JP | P2000-195495 A | | 7/2000 |
| JP | 2002-216846 | * | 8/2002 |
| JP | 2002-216846 | | 8/2002 |
| JP | P2002-334687 A | | 11/2002 |

OTHER PUBLICATIONS

European Search Report Issued in corresponding European Patent Application No. 04009894.9-1227, dated Feb. 26, 2007.

* cited by examiner

*Primary Examiner*—Jonathan Crepeau
*Assistant Examiner*—Tony Chuo
(74) *Attorney, Agent, or Firm*—McDermott Will & Emery LLP

(57) ABSTRACT

A bipolar battery includes a bipolar electrode and an electrolyte layer. The bipolar electrode includes a current collector, a positive electrode layer formed on one surface of the current collector, and a negative electrode layer formed on the other surface of the current collector. The bipolar electrode is sequentially laminated to provide connection in series via the electrolyte layer to form a stack structure. The positive electrode layer, the negative electrode layer and the electrolyte layer are potted with a resin portion.

15 Claims, 8 Drawing Sheets

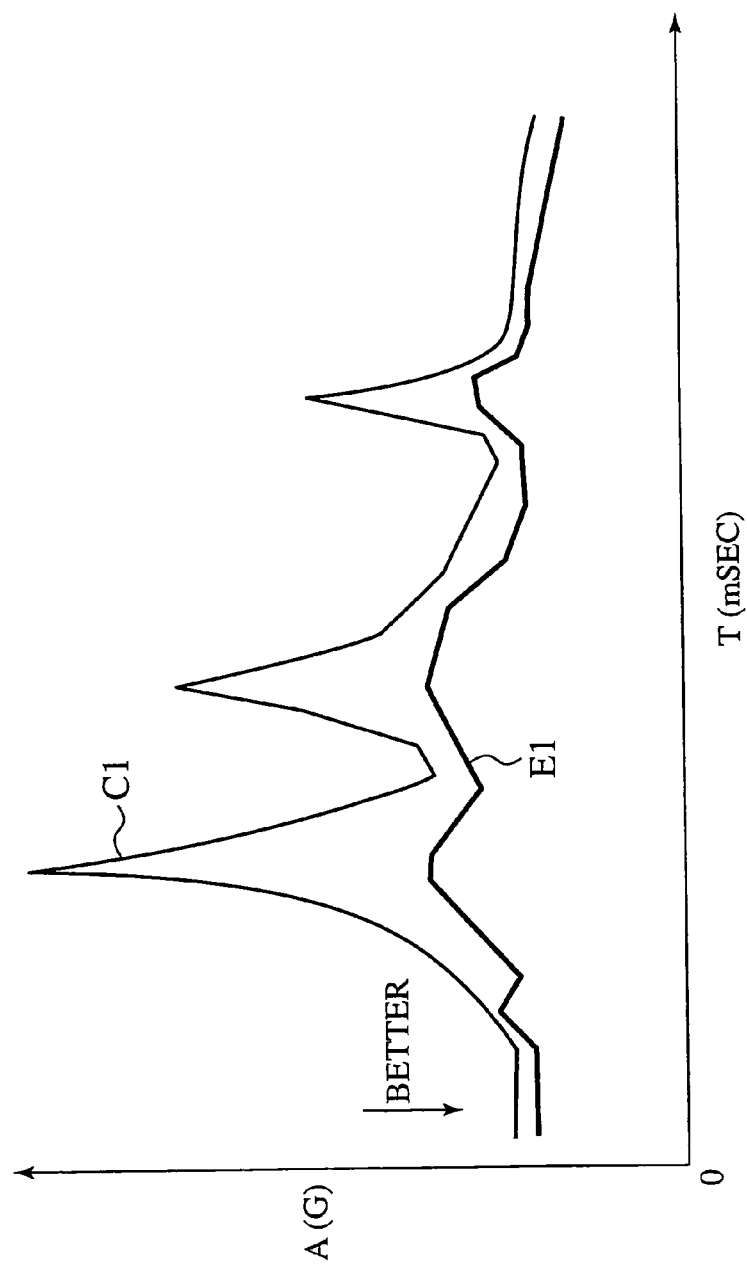

BIPOLAR BATTERY AND METHOD FOR MANUFACTURING THE SAME

BACKGROUND OF THE INVENTION

The present invention relates to a bipolar battery and a manufacturing method therefor and, more particularly, to a bipolar battery with a bipolar structure, which has at least one of series-connected structures with each combination of a positive electrode and a negative electrode while having detection tabs, and its manufacturing method.

In general, a battery with an exterior covered with resin has a structure that includes a metal can that is further covered with resin to provide waterproof.

Japanese Patent Application Laid-Open Publication No. 2000-195495 discloses a bipolar battery formed in a sheet shape that in particular, if the bipolar battery includes a lithium secondary sheet battery having a distaste for contact with moisture, proposes to accommodate a sheet-like battery element in an envelope formed of a waterproof film (with reference to Paragraph 0021).

Japanese Patent Application Laid-Open Publication No. 2002-334687 discloses a lithium ion battery and a polymer lithium battery for use in small-size electronic equipment such as a portable phone and, more particularly, proposes a method of manufacturing a waterproof casing structured with a plurality of members wherein under a condition in which respective component parts of the casing are mounted in a mold, adhesive resin is poured through an adhesive resin pouring port formed in the mold into an adhesive resin filling path to allow adhesive resin to flow around a mating portion along a joint section of the casing so as not to be brought into contact with an interior battery element whereupon adhesive resin is hardened. Such a structure is contemplated to cover the proximities of joint sections between plural members that form the casing with adhesive resin for thereby increasing waterproof of the joint sections.

SUMMARY OF THE INVENTION

However, upon studies conducted by the present inventors, even though such a former structure is possible to enhance waterproof, in case where such a battery is installed, as a vehicle drive power supply or an auxiliary power supply, on a vehicle such as an electric vehicle, a fuel cell powered vehicle and a hybrid vehicle, since the battery encounters vibrations and impacts occurring during running of the vehicle, the use of the mere envelope composed of the waterproof film tends to be hard to provide vibration proof and impact resistance to the battery element accommodated in the envelope. Also, when utilizing the battery as such a vehicle drive power supply, it is conceivable that heat build-up occurs especially at an extracted portion of the electrode tab resulting from large electric current flow during charging and discharging cycles with a resultant tendency in adverse affects on gas-tightness, insulation, heat resistance, electrolyte-liquid resistance and an equalized-pressure retaining property.

Further, even though such a latter structure is possible to enhance waterproof, since the application purpose is mainly intended for use in portable equipment such as a portable phone, the presence of resin serves only to seal mere joint sections, involving an exterior and an interior, of the component parts of the casing water-tight with adhesive resin. Therefore, as a vehicular power supply, the battery of the related art tends to be insufficient in providing vibration proof and impact resistance to the battery element inside the casing when encountered with vibrations and impacts occurring during running of the vehicle. Similarly, it is conceived that there is a tendency wherein adverse affects occur on gas-tightness, insulation, heat resistance, electrolyte-liquid resistance and equalized-pressure retaining characteristic as a result of heat build-up at the extracted portion of the electrode tab due to flow of large electric current during charging and discharging cycles.

The present invention has been completed upon such studies conducted by the present inventors and has an object to provide a bipolar battery, which in addition to waterproof required in a power supply for portable equipment that is a main application of a lithium secondary battery with a dislike to contact with moisture, exhibits improved gas-tightness and additionally has improved vibration proof and impact resistance as a power supply to be enabled for installation on a vehicle, and its manufacturing method.

To achieve such an object, in one aspect of the present invention, a bipolar battery comprises: a bipolar electrode provided with: a current collector; a positive electrode layer formed on one surface of the current collector; and a negative electrode layer formed on the other surface of the current collector; an electrolyte layer permitting the bipolar electrode to be sequentially laminated through the electrolyte layer so as to be connected in series to form a stack structure; and a resin section with which the positive electrode layer, the negative electrode layer and the electrolyte layer are potted.

Stated in another way, in another aspect of the present invention, a bipolar battery comprises: a bipolar electrode provided with: a current collector; a positive electrode layer formed on one surface of the current collector; and a negative electrode layer formed on the other surface of the current collector; an electrolyte layer permitting the bipolar electrode to be sequentially laminated through the electrolyte layer so as to be connected in series to form a stack structure; and potting means for potting the positive electrode layer, the negative electrode layer and the electrolyte layer.

On the other hand, in another aspect of the present invention, there is provided a method of manufacturing a bipolar battery, comprising: preparing a bipolar electrode provided with: a current collector; a positive electrode layer formed on one surface of the current collector; and a negative electrode layer formed on the other surface of the current collector; sequentially laminating the bipolar battery via an electrolyte layer so as to provide connection in series; and potting the positive electrode layer, the negative electrode layer and the electrolyte layer.

Other and further features, advantages, and benefits of the present invention will become more apparent from the following description taken in conjunction with the following drawings.

BRIEF DESCRIPTION OF THE DRAWINGS

FIG. 4 is a graph illustrating vibration spectrums, of bipolar batteries of Example 1 and Comparative Example 1, measured by an acceleration pickup, in the presently filed embodiment;

DETAILED DESCRIPTION OF THE PREFERRED EMBODIMENTS

Figure 1:
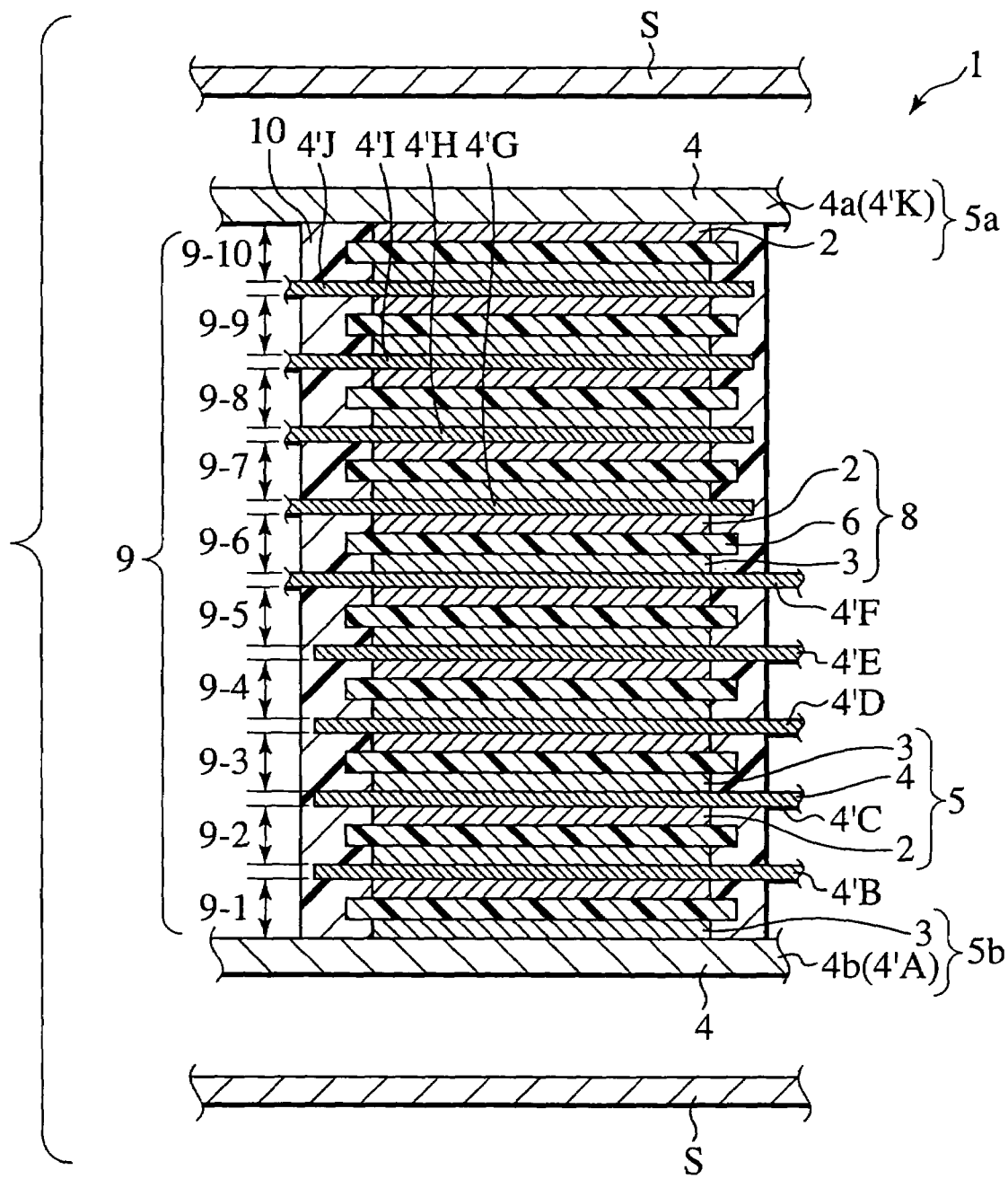
FIG. 1 is a cross sectional schematic view typically illustrating a bipolar battery of the presently filed embodiment according to the present invention.

Hereinafter, a bipolar battery of an embodiment and its manufacturing method according to the present invention are described in detail with reference to FIGS. 1 to 8 of the accompanying drawings.

The bipolar battery of the presently filed embodiment contemplates: a factor (1) to be of a battery with a bipolar structure composed of at least one or more than one series structures each of which is in combination of a positive electrode and a negative electrode; a factor (2) to have detection tabs; and a factor (3) to include a battery element with an exterior which is covered (by potting) with at least one or more than one resin groups.

The bipolar battery to be an objective of the presently filed embodiment is not particularly limited. In case where the bipolar battery is categorized in a structure or in the form of the bipolar battery, no particular limitation is intended to a stack type (flat type) battery and a wound type (cylindrical type) battery and the bipolar battery is applicable to a variety of structures.

Similarly, even though the bipolar battery is categorized in a kind of electrolyte of the bipolar battery, no particular limitation is intended and the bipolar battery of the presently filed embodiment can be applied to any one of a liquid electrolyte battery with a separator (inclusive of an non-woven fabric separator) impregnated with electrolyte solution, a polymer gel electrolyte battery and a solid polymer electrolyte (solid electrolyte as a whole) battery both of which are so-called polymer batteries. Among these electrolytes, the polymer gel electrolyte and the solid polymer electrolyte (solid electrolyte as a whole) may be solely used. In another alternative, the separator (inclusive of the non-woven fabric separator) may be impregnated with the polymer gel electrolyte and solid polymer electrolyte (solid electrolyte as a whole), and no particular limitation is intended. Also, the bipolar battery of the presently filed embodiment is also applicable to any of a primary battery and a secondary battery.

Likewise, in view of electrode material of the bipolar battery or metallic ions that move across electrodes, the bipolar battery of the presently filed embodiment is not particularly limited to a specific type of bipolar batteries such as a bipolar lithium ion battery, a bipolar sodium ion battery, a bipolar potassium ion secondary battery, a bipolar nickel hydrogen secondary battery, a bipolar nickel cadmium secondary battery and a nickel hydrogen battery, and bipolar battery of the presently filed embodiment is also applicable to those composed of a variety of electrode materials. Preferably, the bipolar battery of the presently filed embodiment is applicable to a bipolar lithium ion battery. This is because of the fact that the bipolar lithium ion battery has a unit cell (unit cell layer) voltage and is capable of achieving a high-energy density and a high power-output density while it is excellent as a drive power source or an auxiliary power supply of a vehicle.

Accordingly, although the presently filed embodiment is described in the following description with reference to an example of the bipolar lithium ion battery, the presently filed embodiment has no intention to be limited to such an application.

Hereinafter, a concrete structure of a bipolar battery of the presently filed embodiment is described more in detail in conjunction with the accompanying drawings.

Figure 2:
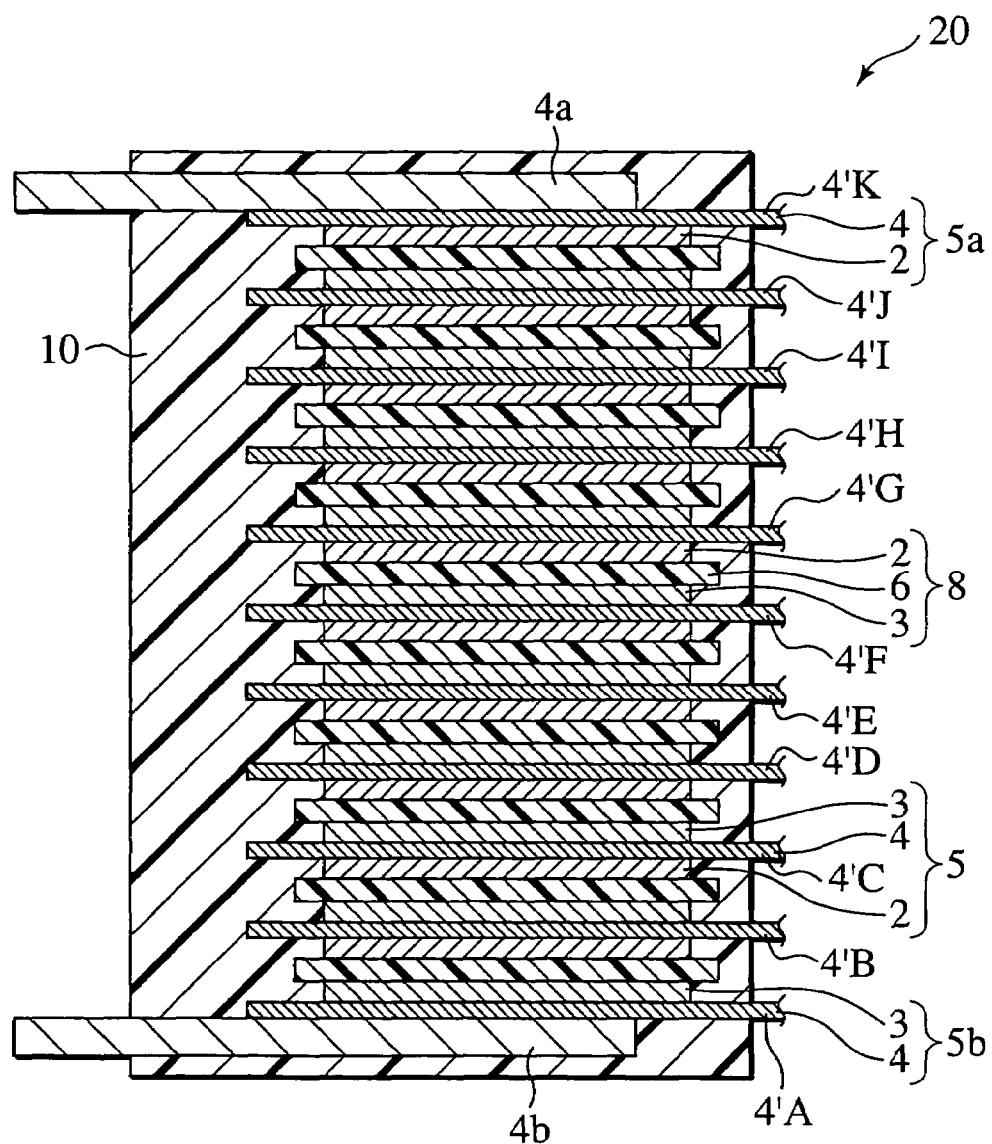
FIG. 2 is a cross sectional schematic view typically illustrating a bipolar battery of a modified form of the bipolar battery of the presently filed embodiment.

FIG. 1 is a cross sectional schematic view typically illustrating a bipolar battery of the presently filed embodiment according to the present invention, and FIG. 2 is a cross sectional schematic view typically illustrating a bipolar battery of a modified form of the bipolar battery of the presently filed embodiment.

As shown in FIG. 1, first, the bipolar battery 1 of the presently filed embodiment includes, as the above-described factor (1), at least one or more than one serial structures each of which is in combination with a positive electrode and a negative electrode. Here, by the bipolar structure is meant the structure that includes bipolar electrodes 5 each of which includes a current collector 4 having one surface formed with a positive electrode layer (positive electrode active material layer) 2 and the other surface formed with a negative electrode layer (negative electrode active material layer) 3 while the positive electrode and the negative electrode of the bipolar electrode 5 sandwiching the electrolyte layer 6 are disposed in opposition to one another.

That is, the bipolar battery 1 is comprised of an electrode stack body (also referred to as a battery element 9 or a bipolar battery body) with a structure composed of a plurality of stacks including the bipolar electrodes 5 each comprised of the positive electrode 2, formed one surface of the current collector 4, and the negative electrode layer 3 formed on the other surface of the current collector 4.

Further, with the presently filed embodiment, as shown in FIG. 1, the uppermost electrode 5a and the lowermost electrode 5b, which form the outermost portions of the electrode stack body comprised of the above-described bipolar electrodes stacked in a plurality of sheets, may not take the form of the bipolar electrode. That is, the outermost electrodes take the form of structures (non-bipolar electrode structures) wherein only one desired surface of each of the uppermost current collector 4 that doubles as a positive electrode tab 4*a* and the lowermost current collector 4 that doubles as a negative electrode 4*b* is formed with the positive electrode layer 2 or the negative electrode layer 3, whose peripheries are covered by potting with a resin group.

Further, a bipolar battery, of a modified form shown in FIG. 2, has a structure composed of, in addition to the outermost current collectors 4, a positive electrode tab 4*a* and a negative electrode tab 4*b* that are coupled to the outermost current collectors 4, respectively, whose peripheries are covered by potting with a resin group.

In any case, loads (a motor and electrical equipment) are connected to the positive electrode tab and the negative electrode tab through which extremely large charging and discharging electric current flows. For this reason, a width and thickness (in other words, a cross sectional area) of the positive electrode tab and the negative electrode tab are determined based on a value of electric current that would mainly flow through these tabs during charging and discharging cycles.

Further, as typically shown in FIG. 1, the battery element 9 is comprised of ten unit cells (unit cell layers) 8 designated as 9-1 to 9-10 and, of course, no limitation is intended to such a number.

That is, the number of times for the bipolar electrodes (inclusive of the outermost non-bipolar electrodes) to be stacked is adjusted depending upon desired output voltage. If the terminal voltage of the unit cell is set to 4.2 V, the terminal voltage (battery voltage) of the battery element 9 comprised of series connected unit cell layers equivalent to ten cells lies at 42 V. With the bipolar battery, since the terminal voltage of the unit cell layer per one piece is higher than the terminal voltage of a general secondary battery such as a lithium ion secondary battery with no use of bipolar electrodes, it is possible to easily structure a battery with a high voltage.

Next, the bipolar battery 1 of the presently filed embodiment includes a battery of a bipolar structure with the detection tabs as the factor (2) set forth above. This is reflected from the fact in that if unevenness occurs in voltage between respective unit cell layers 8 (respective elements 9-1 to 9-10 of the battery element), a probability arises wherein one unit cell layer results in an overcharging state and the other unit cell layer results in an over-discharging state with a resultant difficulty in achieving stable use. Therefore, by utilizing the detection tabs, as voltage detection tabs for detecting the terminal voltage of each unit cell layer, which is connected to an appropriate external control circuit (such as a voltage detection circuit or an electric current bypass circuit) through leads in use, the voltage for each unit cell layer can be monitored. Additionally, letting charging current or discharging current of the unit cell layer 8, whose abnormal voltage (voltage deviated from a rated range) is detected, to flow through a bypass circuit enables the occurrence of overcharging and over-discharging phases to be effectively eliminated. This results in suppression of the overcharging and over-discharging statuses as a result of an unevenness occurring in voltage between the unit cell layers caused by the unit cell layers being serially connected inside the battery, enabling the bipolar battery to be stably and safely used for a long period.

Such detection tabs may preferably include voltage detection tabs for detecting a voltage of each unit cell, but they are not particularly limited to such components and it is needless to say that the detection tabs may be provided for the purpose of detecting the other battery characteristics. Incidentally, a width and thickness of the voltage detection tab are determined based on a value of bypass electric current that would mainly flow through the tabs during an abnormal stage. With the presently filed embodiment, no needs arises for the detection tab to have a rigidity to suppress vibrations of the bipolar battery, a portion of the thin current collector can be used as the detection tab as it is.

With the presently filed embodiment, as shown in FIG. 1, the respective current collectors 4 are used as the detection tabs, that is, the voltage detection tabs 4' (4'A to 4'K). Although it is, of course, needless to say that the voltage detection tabs (not shown) may be electrically connected to the current collectors directly or through voltage detection leads (not shown), such an attempt results in an increase in the number of objects for the potting to be provided using the resin group for the purpose of providing vibration proof accompanied by an increase in the number of connecting works and, hence, it can be said to be desirable to use each current collector both as the voltage detection tab. In such case, as shown in FIGS. 1 and 2, the bipolar battery takes the form of a structure wherein portions of the respective current collectors of the bipolar structure are exposed to the outside of the resin group and the remaining battery element is potted with the resin group and such exposed portions may preferably utilized as the detection tabs and output tabs.

Figure 6A:
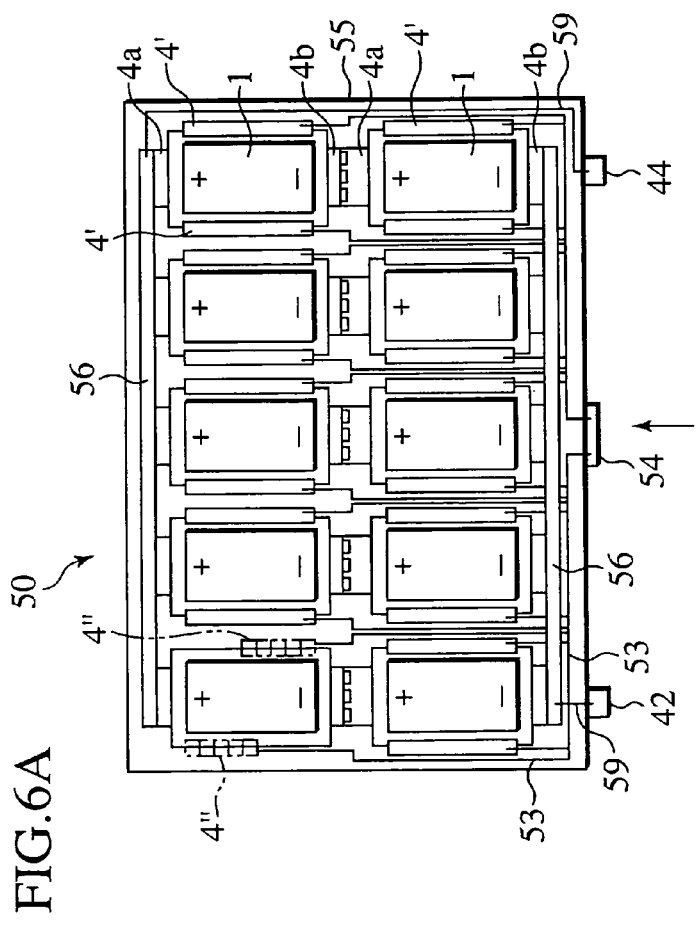
FIG. 6A is a plan view of a battery module with an interior being transparently shown through an outer case, in the presently filed embodiment.

In case of the stack type bipolar battery exemplified in the embodiments shown in FIGS. 1 and 2, the bipolar battery takes the form of a rectangular configuration, as shown in FIG. 6A which will be described below in detail, and is utilized in ways: as shown in FIG. 1, one way includes a structure wherein the voltage detection tabs 4' connected to the battery element 9 are separately extracted from two opposing sides (right and left sides in FIG. 1) of the rectangular configuration, respectively; and as shown in FIG. 2, the other way includes a structure wherein the voltage detection tabs 4' are extracted in parallel from one side (right side in FIG. 2) of the rectangular configuration. In any case, the presence of the voltage detection tabs 4', exposed from the sides (right and left sides in FIG. 1 and FIG. 2), other than the sides (upper and lower sides in FIG. 1 and FIG. 2) from which the electrode tabs (namely, the positive electrode tab 4*a* and the negative electrode tab 4*b*) are extracted, is advantageous in that no crossing of lead wires occurs. It is, of course, needless to say that a structure, in which both the electrode tabs 4*a*, 4*b* and the voltage detection tabs 4' are extracted from the same side, is involved in a spirit or scope of the presently filed embodiment.

Further, as shown in FIGS. 1 and 2, the voltage detection tabs 4' are elongated (exposed) outward respectively from the opposing two sides and from the one side (in substantially overall length thereof) in situ. Of course, in case where the bipolar battery includes detection tabs 4" (formed in the same cross sectional structure as that of FIG. 1) each with a narrow width without employing an overall length of one side as shown in FIG. 6A which will be described below in detail, the voltage detection tabs may be exposed at displaced positions for the respective unit cell layers, and only portions of the respective current collectors on one side or the opposing two sides thereof (further, in case of extracting the electrode tabs from one side, the other remaining three sides may be used) may be extended (exposed) to the outside to form the detection tabs for use, with no limitation being intended to such a structure. Thus, a layout of the detection tabs may be suitably determined in accordance with an intended use depending upon advantage of the former structure in view of vibration proof, shock resistance, equalized pressure retaining capability and heat radiation effect to count an increase in an internal temperature of the battery and the other advantage of the latter structure in view of a light weight, gas-tightness resulting from reduction in contact surface area between the resin group and the detection tabs, waterproof, electrolyte-liquid resistance and an ease of wiring leads into a narrow space between the adjacent voltage detection tabs. Incidentally, since no high temperature rise occurs in the voltage detection tabs even when flowing large electric current through the positive electrode and negative electrode tabs during charging and discharging cycles, an extremely less peeling occurs in the contact surface (boundary surface) between the resin group and the detection tabs as a result of a difference in coefficients of thermal expansion and, in view of such an aspect, the latter structure may be possibly adopted.

Further, it is convenient for leads to be wired such that the detection tabs are extracted in a direction opposite to the other direction in which the outermost current collector that doubles as the positive electrode tab 4a and the outermost current collector that doubles as the negative electrode tab 4b are extracted, that is, as shown in FIG. 1 and FIG. 6A which will be described below in detail, the detection tabs are extracted from the one side (in a direction) different from the other side from which the positive electrode tab 4a and the negative electrode tab 4b are extracted. For the same reason, as the number of stacks of the bipolar electrodes 5 increases, the detection tabs may be extracted in different directions for each unit cell layer 8 from the two sides different from the other two sides from which the positive electrode tab and the negative electrode tab are extracted (in two directions), and no particular limitation is intended to such configuration.

Furthermore, the number of voltage detection tabs to be extracted from the respective sides of the battery may be allocated in accordance with the number of sides from which the detection tabs are extracted and the length of the relevant sides. In case of the bipolar battery 1 shown in FIG. 1, the same number of voltage detection tabs is extracted from the left and right sides. Also, when using the detection tabs each formed with a narrow width without using an overall length of the side of each voltage detection tab, for the sake of managing component parts, it is advantageous for the respective voltage detection tabs to have the same width and to be disposed in positions with an equal distance. Additionally, letting the voltage detection tabs to be extracted from left and right sides in evenly divided number of pieces while letting the width of the respective voltage detection tabs and the distance between the adjacent voltage detection tabs to be equalized enables the bipolar batteries to be located in a favorable balance. Also, at the same time, no excessive load is applied to a particular voltage detection tab to further reduce the occurrence of breakdown in the particular detection tab due to vibrations and an adequate reliability can be obtained even in applied to a vehicle. Moreover, if the voltage detection tabs are disposed in layout with an equal distance, the short-circuiting between the tabs can be avoided, providing an ease of mounting a socket and leads for connecting the tabs.

As shown in FIG. 1, with the presently filed embodiment, in order for the voltage detection tabs to be allocated to the two sides of the battery element to allow detection of the terminal voltages of all the unit cells, two pieces of voltage detection tabs are connected to the two opposing sides of the current collector centrally located in the battery element and extracted from these two opposing sides. This enables the terminal voltage between unit cell layers to be detected.

Further, in case where the voltage detection tabs are formed with the narrow width without being formed in the overall length of the side of the battery element, the voltage detection tabs may be extracted, in order along a longitudinal direction, from the side of the battery element in a sequence in which the bipolar electrodes are stacked. That is, one group of the voltage detection tabs, covered in a range between the detection tab formed on an exposed portion of the current collector disposed at the lowermost position of the battery element and the detection tab formed on an exposed portion of the current collector at the center of the battery element may be sequentially extracted from the right sides of the current collectors, and the other group of the voltage detection tabs, covered in another range between the detection tab formed on the exposed portion of the current collector at the center of the battery element and the detection tab formed on an exposed portion of the current collector disposed at the uppermost position of the battery element may be sequentially extracted from the left sides of the current collectors. In such a way, letting the respective voltage detection tabs to be extracted in order enables the potted (sealed) portions, formed with the resin group, of the respective voltage detection tabs to have improved gas-tightness, resulting in improvement over a reliability of the bipolar battery. Also, the leads can be extracted from the bipolar battery in a smooth fashion and no excessive voltage is applied to the detection tabs, providing a further reduction in the occurrence of breakdown in the tabs due to vibrations with a resultant capability of enhancing an adequate reliability even when applied to the vehicle.

Next, as the factor (3) set forth above, the bipolar battery 1 of the presently filed embodiment contemplates that, as shown in FIGS. 1 and 2, the exterior of the battery element is covered (by potting) with at least one ore more than one resin groups 10. That is, with the presently filed embodiment, in order to enable the battery element 9 to have enhanced gas-tightness, the battery element 9 is covered (by potting) with the resin group such that an outer circumferential periphery of the battery element 9 is filled with and buried in, i.e., potted by the resin group. Here, by potting the exterior of the battery element with the resin group to maintain gas-tightness of the battery is meant that there is a situation in which electrolyte constituent (electrolyte solution or gel electrolyte) does not exude (in leakage of liquid) from the battery and no atmospheric air is admitted to the inside of the battery. Thus, by potting the exterior of the battery element with the resin group, gas-tightness of the battery can be maintained, enabling an outer sheath of the battery to be formed of resin.

Accordingly, there is no need for can metal and laminate material (such as composite laminate-film made of polymer-metal) to be provided in terms of a function. Additionally, the presently file embodiment is advantageous in that the exterior of the battery element is covered by potting with the resin group and, in addition to the enhancement of gas-tightness of the battery, the battery further has insulation, waterproof, heat resistance and electrolyte-liquid resistance. Particularly, with a view to exhibiting such advantages and effects, the battery element 9 may be preferably covered (by potting) with the resin group so as not to create gaps (air gaps, pores, cavities) between the battery element 9 and the resin group 10.

Moreover, due to the presence of the potting with the resin group, a distance between respective current collectors can be retained. This enables the current collectors to be kept under equalized pressure and to be pressed. In addition, since visco-elasticity inherent to the resin group 10 is possible to press the respective current collectors 4 and keep the same under equalized pressure and, hence, the resulting battery is excellent in that vibrations resulting from the vehicle can be effectively decreased even when utilized as an on-vehicle battery.

Here, by the battery element 9 is meant that it has a structure similar to that of the unit cell 8 as designated at 9-1 to 9-10 in FIG. 1, as set forth above, that is, the battery element 9 is structured with at least a positive electrode (the positive electrode layer 2 and the current collector 4), a negative electrode (the negative electrode layer 3 and the current electrode 4), an electrolyte layer (composed of a separator and electrolyte solution, a polymer gel electrolyte, and a polymer solid electrolyte) 6, except for the resin group forming an outer sheath. Accordingly, depending upon a kind of the battery, the battery element includes the positive electrode tab 4a and the negative electrode tab 4b, except for the current collectors, and the detection tabs 4' except for the current collectors 4. Also, due to the presence of the bipolar structure, the respective battery elements 9-1 to 9-2 include the common current collector that doubles as the detection tab 4'B. Moreover, unless otherwise rejected, if the battery element is merely mentioned, the battery element is assigned to designate an entire battery stack body that is comprised of respective battery elements (unit cell layers).

More particularly, it can be said that with the presently filed embodiment, portions of the current collectors (foils) of the bipolar structure are exposed to the outside of the resin group and remaining battery element is covered by the potting with the resin group.

Here, by the structure with the portions of the current collectors (foils) being exposed to the outside of the resin group is meant that just only a fraction of an outer peripheral portion of the current collector (foil) may be exposed to allow the detection tabs to be extracted as leads. The presence of the portions of the current collectors (foils) exposed to the outside of the resign group is advantageous in that the current collectors (foils) can be utilized as the detection tabs, enabling reduction in the number of component parts and saving the task (the number of steps) for mounting the detection tabs to the respective current collectors.

That is, as shown in FIGS. 1 and 2, in order for the detection tab to be extracted as the lead, a portion of or an entire portion (in an overall length) of an outer periphery of each current collector are exposed in a structure shown in FIG. 1, and a portion of or an entire portion (in an overall length) of one side of each current collector 4 are exposed in a structure shown in FIG. 2. Incidentally, with the structure of FIG. 1, due to the presence of the uppermost and lowermost current collectors 4 being used both as the detection tabs and the electrode tabs 4a, 4b, respectively, the outermost surface areas (in which no particular adverse affect arises on a capability of maintaining gas-tightness of the battery element even in the absence of the resin group covering such surface areas) of the current collectors 4 are exposed for the purpose of increasing heat radiating properties of the electrode tabs. Moreover, with any of the structures shown in FIGS. 1 and 2, regardless of the presence of or the absence of the voltage detection tab used both as the current collector, the positive electrode tab 4a and the negative electrode tab 4b have outer peripheries which are partly exposed from the resin group 10 so as to allow these electrodes to be extracted as the leads and, in this respect, such a structure is similar to a structure wherein electrode tabs of an existing battery are exposed from an envelope S (representatively shown only in FIG. 1 made of a waterproof film serving as outer sheath material.

By the way, the bipolar battery mentioned above may further employ a structure described below.

Figure 5:
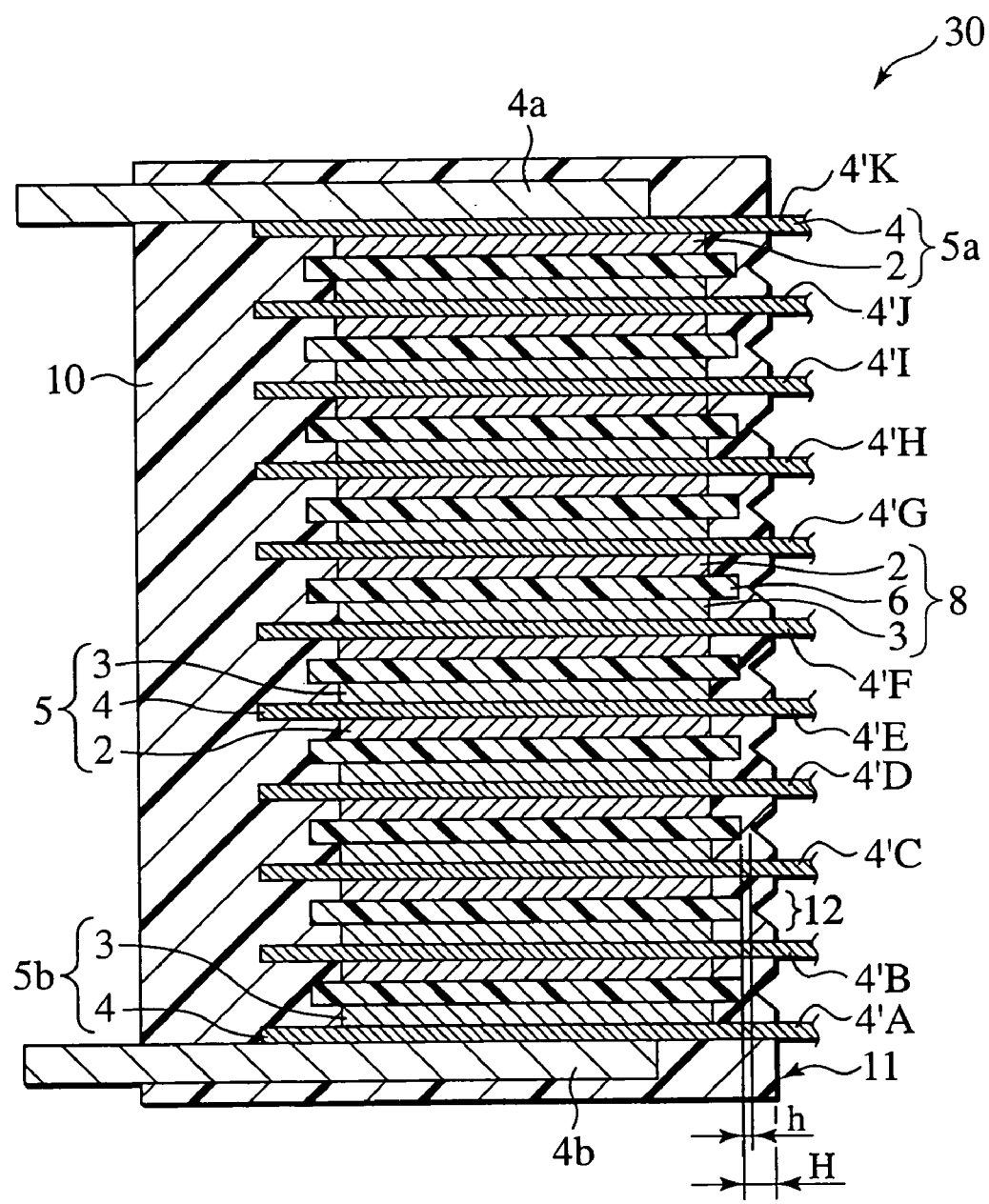
FIG. 5 is a cross sectional schematic view typically illustrating a bipolar battery of a modified form of the presently filed embodiment.

FIG. 5 is a cross sectional schematic representation typically illustrating a bipolar battery of a modified form of the presently filed embodiment. Incidentally, for the sake of convenience in description, although the bipolar battery of the modified form is described in conjunction with the bipolar battery of the structure shown in FIG. 2, it is, of course, to be noted that a principle of the modified form may also be applied to the structure of FIG. 1.

The bipolar battery 30 of the modified form, shown in FIG. 5, includes a resin group at least one portion which has an area that is thinner in potting thickness than a general surface. The presence of such a potted thin area enables the potted thin area to effectively release gases during an increase in the internal pressure of the battery under abnormal condition, thereby providing an effect of a relief valve. This is advantageous in that although a usual battery needs to be mounted with a relief valve with a complicated structure and, therefore, a simplified structure is desired in view of costs on production, use of such a structure makes it possible to provide a relief valve with a simplified structure.

Here, as shown in FIG. 5, by the potting thickness is meant the thickness between the electrolyte layer 6 of the battery element 9 and an outer surface (general surface) 11 of the resin group 10, and by the general surface 11 is meant the outer surface (except for the thinned area 12) of the resin group. As shown in FIG. 5, at least a portion of the resin group 10 includes the area 12, with the potting thickness h that is thinner than the potting thickness H (corresponding to a distance between the electrode or the electrolyte, of which electrolyte is referred to, and the general surface) of the general surface 11, and the area 12 with the potting thickness h is formed in a gas releasable configuration or a notch configuration. Although such a thinned area 12 has a thickness to the extent that, when installed on a vehicle as a power supply, is never broken even when encountered with vibrations and impacts during running of the vehicle and temperature rise in the battery due to charging and discharging cycles, the thinned area 12 may be lower in thickness than the general surface area to the extent that if internal pressure rapidly increases as a result of the occurrence in abnormality (such as short-circuiting or over-charging) in the battery, the thinned area 12 is reliably broken away to preclude the other unit cell layers from adverse affect. The potting thickness h is determined in accordance with a capacity of the unit cell layer, a thickness of the electrode layer and a kind of electrolyte. It is desired that the battery is artificially caused to be preliminarily brought into an over-charging condition in accordance with specifications required for an actual battery for thereby confirming which thickness is proper for the potting thickness h of the thinned area 12 to correctly function as the relief valve.

As shown in FIG. 5, the thinned area 12, which is lower in thickness H than the general surface 11, may be preferably formed for each unit cell layer 8 (each of the battery elements 9-1 to 9-10): Because this leads to the formation of the relief valve for each individual unit cell layer 8 to allow the thinned area 12 to individually count an increase in the internal pressure resulting from abnormality occurring in the associated individual unit cell 8. This results in a capability of avoiding the other unit cell layers 8 from adverse affect for thereby preventing the battery from damage due to spread of adverse affect on a whole battery. At the same time, it is preferable for the detection tabs 4' located for each unit cell layer 8 to detect the presence of the unit cell layer 8 bearing abnormality for thereby permitting charging or discharging current to bypass. This is effective for the entire unit cells or the whole battery to have a voltage value from which voltage drop merely occurs by a level equivalent to a voltage component of the unit cell 8 encountered with abnormality. Thus, with the battery applied to a vehicle as a drive power source, even when abnormality occurs in the battery during running of the vehicle, no probability occurs for the battery to rapidly shut down the supply of electric power to enable the vehicle to continuously run in a safety mode and it becomes possible to keep the power supply at a rate sufficient for clearing the vehicle out of a travel lane to an evacuation site such as road shoulders, enabling the vehicle to have a further enhanced safety.

With the bipolar battery of the presently filed embodiment set forth above, the presence of the battery element whose exterior is covered by the potting with at least one or more than one resin groups each of which provides a capability of exhibiting waterproof, heat resistant, gas-tightness and electrolyte-liquid resistance required for the outer sheath of the battery and, in addition, it is of course possible for insulation of the battery element to be enhanced while enabling the current collectors 4, that is, the electrodes to be kept under equalized pressure in a manner as will be described below.

Figure 3A:
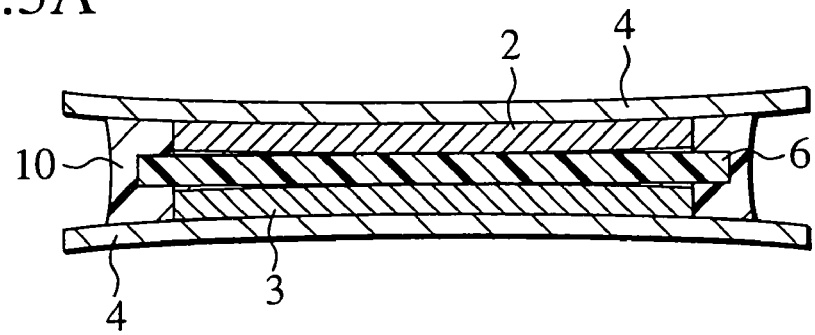
FIG. 3A is a cross sectional schematic view of the bipolar battery typically illustrating a status wherein a deviation occurs in a distance between associated current collectors, in the presently filed embodiment.
Figure 3B:
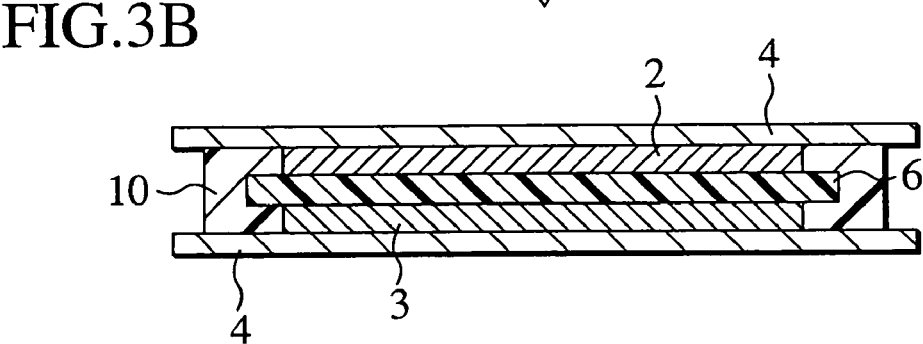
FIG. 3B is a cross sectional schematic view of the bipolar battery typically illustrating a status wherein the distance between the associated current collectors is restored to an original position, in the presently filed embodiment.

FIG. 3A is a schematic cross sectional representation typically illustrating a status in which deformation occurs in a distance between the current collectors; FIG. 3B is a schematic cross sectional representation typically illustrating an appearance in which the distance between the current collectors are recovered to its original condition; and FIG. 3C is a schematic cross sectional representation typically illustrating a status in which deformation occurs in the distance between the current collectors.

Figure 3C:
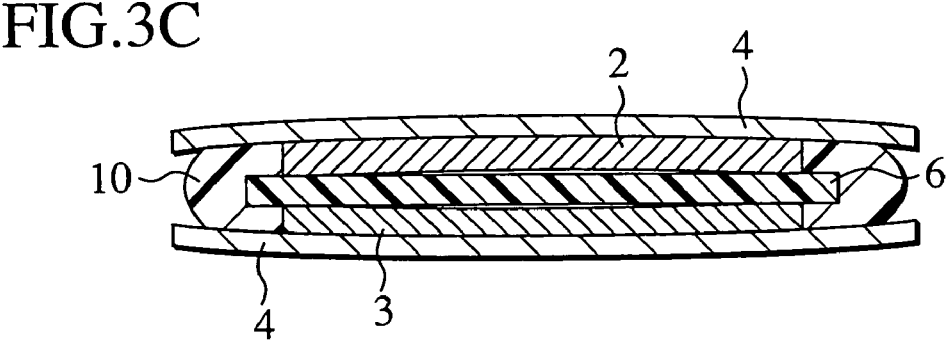
FIG. 3C is a cross sectional schematic view of the bipolar battery typically illustrating a status wherein another deviation occurs in the distance between the associated current collectors, in the presently filed embodiment.

As shown in FIGS. 3A to 3C, with the bipolar battery of the presently filed embodiment set forth above, the battery element 9, especially, overall circumferential peripheries of the current collectors 4 are sealed and covered with the potting using the resin group 10, enabling the current collectors 4, that is, the associated electrodes to be kept under equalized pressure.

In particular, if a stable condition of the battery remains in the condition shown in FIG. 3B, due to expansion resulting from charging and discharging cycles, even when a central area of the battery element is pushed and imparted with pressure to render peripheral portions to be widened to cause deviation in the distance between the current collectors, as shown in FIG. 3A, while the central area of the battery element is imparted with pressure to render the central portion to be expanded to cause deviation in the distance between the current collectors as shown in FIG. 3C, the battery restores to its original position shown in FIG. 3B due to a restoring (recovering) force resulting from excellent visco-elasticity provided by the resin group 10. That is, the resin group 10 absorbs vibrations or impacts to allow the distance between the electrodes to restore to the original condition, enabling the battery to quickly return to a condition where equalized pressure is kept between the electrodes. Therefore, an ability of absorbing or alleviating vibrations or impacts encountered by the vehicle enables remarkable improvements over vibration proof and impact resistance. Also, since no resonance occurs in the battery installed on the vehicle, the occurrence of failure modes such as breakdown of the tab as a result of resonance can be remarkably eliminated (to be substantially zeroed), thereby making it possible to use the battery in safety.

FIG. 4 is a graph illustrating vibration spectrums of an acceleration pickup of bipolar batteries in Example 1 and Comparative Example 1, which will be described below in detail, and the abscissa designates time T while the ordinate designates acceleration A.

As shown in FIG. 4, according to measurements on an average reduction rate in vibrations conducted in Example of the presently filed embodiment, as will be apparent from vibration spectrum E1 of the acceleration pickup of a bipolar battery (with an outer sheath made of the resin group) of Example 1 and vibration spectrum C1 of the acceleration pickup of a bipolar battery (with an outer sheath structured with an envelope formed of a general waterproof film) of Comparative Example 1, when the battery is applied to a vehicle, acceleration to be applied to the battery resulting from vibrations or impacts encountered by the battery during running of the vehicle can be minimized to the extent that no substantial peak is recognized. That is, with the commonly used battery of Comparative Example 1, large acceleration peaks are recognized and, on the contrary, no such a large acceleration peak is present in the structure of the presently filed embodiment to enable the battery to have excellent vibration proof and impact proof against any kind of vibrations that would occur during running of the vehicle.

Furthermore, with the bipolar battery of the presently filed embodiment, the resin group, with which the potting is provided over the whole exterior of the battery element, is defined to be "at least one or more than one" resin groups because it is to be meant that the entire exteriors of the battery elements 9-1 to 9-10, shown in FIG. 1, may be covered with the potting using the resin group 10 in a single material or in combination (in composite form) of more than two materials, or the exteriors of the battery elements may be separately covered with the potting using more than two different kinds of resin groups. In view of a working efficiency, the former is advantageous. On the contrary, with a battery taking the form of a stack structure, the battery has different temperature distributions at the central area and the outermost area while bearing vibrations and impacts at different magnitudes and, therefore, the latter is advantageous particularly in a case where it is preferable to separately use resin groups that have different heat resistance and visco-elasticity.

Moreover, in order to cover the whole exteriors of the battery elements 9-1 to 9-10 with the potting using more than two resin groups, the potting may be provided using those of the resin groups with different characters in a preliminarily mixed or composite state. In an alternative aspect, after covering the entire exteriors or parts thereof with one resin group (preferably of the type that has improved adhesion with respect to the battery element and is excellent in electrolyte-liquid resistance and heat resistance while having insulation, vibration proof, impact proof and equalized-pressure holding capability), the potting may be further provided on the exteriors, on which the potting layers are formed, of the battery elements using the other resin group (preferably of the type that is excellent in insulation, gas-tightness and waterproof and has vibration proof, impact proof and equalized-pressure holding capability) different in characteristic, and no particular limitation is intended to such processing.

Also, as has been already described above, the resin group may be of any type by which potting (covering) the battery elements, forming the bipolar battery, enables the battery to exhibit excellent adhesion while providing highly effective gas-tightness whereas excellent visco-elasticity is exhibited to provide increased vibration proof and impact proof, and no particular limitation is intended to such material. Preferably, the resin group may be of the type that is able to provide further increased insulation, waterproof, heat resistance, electrolyte-liquid resistance and equalized-pressure holding capability.

With the above view in mind, in order for the battery to be protected from external vibrations and impacts, the resin group, which can be used in the presently filed embodiment, may preferably have a resin hardness of JIS A (by this is meant the spring hardness Hs obtained by a spring type hardness test (of the type A) under JIS K6301) in a range equal to or greater than 5 and equal to or less than 95 and preferably in a range equal to or greater than 20 and equal to or less than 90. The presence of the resin group with such characteristic enables more than two current collector foils (the electrodes) to be uniformly kept, and it becomes possible to reliably prevent the occurrence of unevenness in the distance between the current collectors resulting from external vibrations. With the resin hardness of JIS A being less than 5, resin is soft and difficult to uniformly keep the space between the current collector foils and, on the contrary, with the resin hardness of JIS A exceeding 95, resin is too hard with a resultant decrease in vibration proof effect. However, it is, of course, to be noted that even in a case where the resin hardness is out of such a range, the use of the potting provided over the exterior of the battery element provides more excellent vibration proof than that of a structure with no potting provided on an area covered with the resin group between the current collectors.

Further, measurements were conducted on the resin group, which can be employed in the presently filed embodiment, based on a dielectric constant measuring method under JIS K6911. According to such measurements, resin may preferably satisfy: a factor (A) to have dielectric-tangent at a frequency equal to greater than 10 Hz and equal to or less than 1 kHz; a factor (B) to lie in a temperature range equal to or greater than −30° C. and equal to or less than 80° C.; and a factor (C) to lie in dielectric-tangent equal to or greater than $1.0 \times 10^{-3}$ and equal to or less than $5.0 \times 10^{-1}$.

Here, the above factor (A) with the frequency equal to greater than 10 Hz and equal to or less than 1 kHz is derived from a reason that a vibration proof frequency region effective for vibrations of the vehicle resides in such a frequency range. Next, the above factor (B), related to the temperature equal to or greater than −30° C. and equal to or less than 80° C., resides in a temperature range required for the battery of the vehicle and is derived from a reason that a temperature environment of the bipolar battery of the presently filed embodiment to be installed on a vehicle such as a hybrid electric vehicle resides in such a temperature range. Under such factors (A) and (B) set forth above, dielectric-tangent of resin preferably lies in the above range (C) equal to or greater than $1.0 \times 10^{-3}$ and equal to or less than $5.0 \times 10^{-1}$ and, more preferably, in a range equal to or greater than $5.0 \times 10^{-3}$ and equal to or less than $4.0 \times 10^{-2}$. This forms a so-called specification based on which judgment is made to find a vibration proof effect of the resin group and, with dielectric-tangent of resin being less than $1.0 \times 10^{-3}$, resin is two soft with less vibration proof effect. In contrast, with dielectric-tangent of resin exceeding $5.0 \times 10^{-1}$, resin is two hard with less vibration proof effect. However, it is, of course, to be noted that even in a case where the resin hardness is out of such a range, the use of the potting provided over the exterior of the battery element provides more excellent vibration proof than that of a structure with no potting provided on an area covered with the resin group between the current collectors.

Here, dielectric-tangent of resin is adopted for the reason described below. The vibration reduction effect depends upon loss-tangent, and this loss-tangent is possible to be obtained through a dynamic visco-elasticity test. However, due to the presence of a difficulty in accurately measuring loss-tangent of relatively soft resin, the characteristic of resin can be estimated using dielectric-tangent that remains in substantial correspondence to loss-tangent. Therefore, here, dielectric-tangent of resin is stipulated. Accordingly, in a case where loss-tangent of resin can be accurately measured, resin preferably has loss-tangent in a range equal to or greater than $1.0 \times 10^{-3}$ and equal to or less than $5.0 \times 10^{-1}$ for the same reason as that of a case related to dielectric-tangent.

Furthermore, among the resin groups that can be employed in the presently filed embodiment, resin that forms the resin group needs to have performances, such as waterproof, moisture proof, cold cycle property, insulation and fire resistance, and has no particular limitation provided that such performances are derived. This resin includes epoxy family resin, urethane family resin, nylon (polyamide) family resin, olefin family resin, silicone rubber and olefin family elastomer. These are chosen in a single form or in composite form. However, if other resins are possible to achieve the object of the presently filed embodiment and satisfy the performances set forth above, such resins are possible to be used as the resin group, and the presently filed embodiment is not limited to such resins as specified above. Also, resin that forms the resin group set forth above includes rubber and elastomer as set forth above.

Preferably, due to the presence of excellent performances mentioned above, the resin group may be preferably selected from a group comprising epoxy family resin, urethane family resin, nylon (polyamide) family resin and olefin family resin in a single form or in a composite form. Here, by the "composite" is meant that the resin group is composed of basic materials (including such resins or copolymerized resin between monomers of such resins) of more than two kinds and selected so as to make use of excellent features of respective resins; that is, the resin group includes copolymer that is copolymerized using these multiple resin forming monomers (that may further include other copolymerizing monomers) and, in addition thereto, a mixture (such as polymer blend) of different resins of more than two kinds while including those (such as polymer alloys) which are composed of uniformly mixed different resins of more than two kinds with no occurrence of phase separation just like alloy. And, the resin group may also include resins, which are prepared by suitably utilizing a variety of compositing technologies, which includes resin prepared by adding cross-linking agent to these multiple resins to cause bridge reaction and resin prepared by suitably combining these materials and reaction.

Moreover, with the presently filed embodiment, as typically shown in FIG. 1, the outermost current collector sections (the positive electrode tab 4a and the negative electrode tab 4b) of the battery elements 9-1 to 9-10 may preferably have a thickness equal to or greater than 2 times and equal to or less than 50 times greater than the thickness of the other current collectors for the reason listed below. This is due to the fact that increasing the thickness of two outermost current collectors (foils) enables the outermost current collectors to serve both as the positive electrode tab 4a and the negative electrode tab 4b of the battery, respectively. In order to permit large electric current to flow through the battery of the vehicle, current collector, corresponding to the electrode tab, may preferably have an increased thickness. With the outermost current collector having the thickness less than a value 2 times the thickness of the other current collector, remarkable heat-buildup occurs during flow of large electric current. For this reason, freedom of selecting resin materials is liable to be restricted with resultant requirement for the resin group 10, by which the outermost current collectors are covered, to use resin with excellent heat resistance. On the contrary, with the outermost current collector having the thickness exceeding a value 50 times the thickness of the other current collector, the vibration proof effect of the battery as a whole depends on rigidities of the current collectors (foils), and the presence of the potting with the resin group formed over the current collectors results in less vibration proof effect. Also, the outermost current collectors are used both as the detection tabs 4'K and the detection tab 4'A in the manner set forth above.

In the meanwhile, many probabilities exist wherein an actual thickness of the internal current collector falls in a range equal to or greater than 5 µm and equal to or less than 30 µm and, in general, the current collectors with the thickness in a range equal to or greater than 10 µm and equal to or less than 15 µm are frequently in use. It is a general practice to use the outermost current collector with the thickness equal to or greater than 100 µm and equal to or less than 200 µm. However, with the presently filed embodiment, no particular limitation intended to such thickness and a particular thickness may be preferably selected in a range to satisfy the relationship in thickness between the internal current collector set forth above and the outermost current collector.

However, as shown in FIGS. 2 and 5, with the presently filed embodiment, the outermost current collectors and the internal current collectors may have a similar thickness and, separately, the positive electrode tab 4a and the negative electrode tab 4b, both serving as electrode tabs, may be electrically connected to the outermost current collectors, respectively. In such a case, the thickness of the current collector 4 and the thickness of the electrode tabs 4a, 4b may preferably satisfy the relationship specified above, and if an actual thickness falls in the range defined above, such a thickness is available to be utilized. However, considering the thickness of the outermost current collectors, it may be possible to use an electrode tab that is low in thickness by a value corresponding to the thickness of the outermost current collector.

In the foregoing description, although the presently filed embodiment has been described in conjunction with the principal structural elements, inclusive of the modified form, of the bipolar battery of the presently filed embodiment, no particular limitation is intended to the other structural component elements of the bipolar battery of the presently filed embodiment, and suitably utilizing a variety of component elements enables the bipolar battery of the presently filed embodiment to be structured. Hereinafter, although description is made of an exemplary case of a bipolar lithium ion secondary battery with reference to component parts thereof, it is needless to say that the presently filed embodiment is not limited to these component elements.

[Current Collector]

The current collector, which can be used in the presently filed embodiment, is not particularly limited and may employ a variety of materials. These preferably include an aluminum foil, a stainless (SUS) foil, a titanium foil, clad material with nickel and aluminum, clad material with copper and aluminum, clad material with SUS and aluminum or plated material composed of combination of these metals.

Further, use may be made of a composite current collector with a metallic surface covered with an aluminum layer. Furthermore, in some cases, another composite current collector composed of more than two metallic foils laminated together may also be employed.

When using the composite current collector, material of the positive electrode current collector may include electrically conductive metals, such as aluminum, aluminum alloy, SUS and titanium, and particularly, aluminum may be preferably used. On the other hand, material of the negative electrode current collector may preferably include electrically conductive metals, such as copper, nickel, silver and SUS, and particularly, SUS and nickel may be preferably used. Also, with the composite current collector, the positive electrode current collector and the negative electrode current collector may be directly connected or electrically connected through an intermediate layer having an electrical conductivity composed of third material.

The positive electrode current collector and the negative electrode current collector in the composite current collectors may normally have each thickness in a usual thickness range, and both the current collectors approximately lie in a value equal to or greater than 1 µm and equal to or less than 100 µm, and the current collector (inclusive of the composite current collector) may preferably have the thickness of approximately equal to or greater than 1 µm and equal to or less than 100 µm in view of realizing a battery formed in a thin configuration.

[Positive Electrode Layer (Positive Electrode Active Material Layer)]

Structuring material of the positive electrode layer, which can be used in the presently filed embodiment, may be suffice to be of the type that includes positive electrode active material and, if desired, includes conductive promoter agent, binder, electrolyte supporting salt (lithium salt) for increasing ion conductivity, electrolyte, such as polymer electrolyte, and additive.

Electrolyte is fundamentally similar to that which is used in the electrolyte layer and, when using polymer gel electrolyte and liquid electrolyte for the polymer electrolyte layer, it may be suffice to include various binders, by which positive electrode active material particles are coupled, and conductive promoter for increasing electron conductivity and no need may arise to include host polymer of raw material for polymer electrolyte, electrolyte solution and lithium salt. Similarly, even when using liquid electrolyte for the electrolyte layer, the positive electrode layer may not include host polymer of raw material for polymer electrolyte, electrolyte solution and lithium salt.

The positive electrode active material may preferably include composite oxides (lithium-transition metal composite oxide) between transition metal and lithium. In particular, the positive electrode active material may be selected for use from lithium metal oxides that includes Li—Mn family composite oxides, such as $LiMnO_2$, $LiMn_2O_4$, Li—Co family composite oxide such as $LiCoO_2$, Li—Cr family composite oxides such as $Li_2CrO_7$, $Li_2CrO_4$, Li—Ni family composite oxide such as $LiNiO_2$, Li—Fe family composite oxides such as $Li_x$—$FeO_y$ and $LiFeO_2$, Li—V family composite oxides such as $Li_xV_yO_z$ and other composite oxides ($LiNi_xCo_{1-x}O_2$ ($0<x<1$) such as those in which a part of these transition metals are substituted with other element, and the presently filed embodiment is not limited to these materials.

These lithium-transition metal composite oxides are materials that are excellent in reactivity and cycle durability and low in costs. For this reason, using such materials as the electrodes provide an advantageous effect in that it becomes possible to form a battery that is excellent in output characteristic. Additionally, other materials include phosphorus oxides, such as $LiFePO_4$, and sulfate compounds; transition metal oxides, such as $V_2O_5$, $MnO_2$, $TiS_2$, $MoS_2$ and $MoO_3$, and sulfides; and $PbO_2$, $AgO$ and $NiOOH$.

Among the positive electrode active materials set forth above, Li—Mn family oxides may be preferably employed. This is due to the fact that using Li—Mn family oxides makes it possible to increase a slope of a profile of a voltage in terms of state of charge (hereinafter referred to as "SOC" of a battery whereby SOC can be correctly got from a battery voltage, that is, a voltage of each unit cell layer and a bipolar battery as a whole, to provide an improved reliability.

To decrease electrode resistance of the bipolar battery, the positive electrode active material may be used that has a particle diameter (size) smaller than that of the material commonly used in a lithium ion secondary battery that is not the bipolar type. In particular, positive electrode active material fine particles may have an average particle size in a range equal to or greater than 0.1 μm and equal to or less than 50 μm. That is, it is preferable for the average particle to fall in a range equal to or greater than 0.1 μm and equal to or less than 50 μm and, preferably, in a range equal to or greater than 0.5 μm and equal to or less than 20 μm and, more preferably, in a range equal to or greater than 0.5 μm and equal to or less than 5 μm.

Examples of the conductive promoter agent, described above, include acetylene black, carbon black, graphite, a variety of carbon fibers, and carbon nano-tubes. However, no limitation is intended to such materials.

As the above-described binders, polyvinylidene fluoride (PVDF), SBR and Polyamide may be used. But, no limitation is intended to such materials.

The polymer gel electrolyte, among other electrolytes set forth above, includes a solid polymer electrolyte with an ion conductivity, which contains an electrolyte solution that is used in the lithium ion secondary battery with no bipolar type, and, in addition, those in which the similar electrolyte solution is retained in polymer frames with no lithium ion conductivity. Thus, the solid polymer electrolyte among the above-described electrolytes becomes the solid polymer electrolyte that has ion conductivity.

Here, no particular limitation is intended to electrolyte solution (electrolyte salt and plasticizer) to be contained in the polymer gel electrolyte and a variety of electrolyte solutions may be suitably employed. Examples of these compositions include at least one kind of lithium salt (electrolyte salt) selected from inorganic acid anion salts, such as $LiPF_6$, $LiBF_4$, $LiClO_4$, $LiAsF_6$, $LiTaF_6$, $LiAlCl_4$, $Li_2B_{10}Cl_{10}$ and LiBOB (lithium bisoxide borate), and organic acid anion salts, such as $LiCF_3SO_3$, $Li(CF_3SO_2)_2N$ and $Li(C_2F_5SO_2)_2N$ (lithium bis perfluoroethylene sulfonylamide: LiBETI), and also may include a composition employing a plasticizer (organic solvent), such as an aprotic solvent that includes at least one or more than two kinds of compositions selected from cyclic carbonates, such as propylene carbonate and ethylene carbonate, chain carbonates such as methyl carbonate, methyl ethyl carbonate and diethyl carbonate, ethers such as tetrahydrofuran, 2-methyl tetrahydrofuran, 1,4-dioxiane, 1, 2-dimethoxyethane and 1,2-dibuthoxiethane, lactones such as γ-butyrolactone, nitriles such as acetonitrile, esters such as propionic acid methyl, amides such as dimethylformamide, and methyl acetate and methyl formate. However, no such limitation is intended to such compositions.

As the solid polymer electrolyte with the ion conductivity, a variety of solid polymer electrolytes may be listed which include copolymers such as polyethylene oxide (PEO) and polypropylene oxide (PPO).

Examples of polymers with no ion conductivity for use in the polymer gel electrolyte may include polyvinylidene fluoride (PVDF), polyvinylchloride (PVC), polyacrylonitrile (PAN), and poly methyl methacrylate (PMMA). However, no such limitation is intended to such compositions. Also, since PAN and PMMA belong to a category that has almost no ion conductivity, the polymer with the above-described ion conductivity may be employed. But, here, the above samples are exemplified as the polymers with no lithium ion conductivity for use as the polymer gel electrolyte.

Electrolyte supporting salts (lithium salts) for increasing the above-described ion conductivity may include inorganic acid anion salts, such as $LiPF_6$, $LiBF_4$, $LiClO_4$, $LiAsF_6$, $LiTaF_6$, $LiAlCl_4$, $Li_2B_{10}Cl_{10}$, and organic acid anion salts, such as $Li(CF_3SO_2)_2N$ and $Li(C_2F_5SO_2)_2N$, or mixture of these compounds. However, no such limitation is intended to such compositions.

The ratio (in mass ratio) of host polymers to electrolyte solution in polymer gel electrolyte may be determined in accordance with the intended use and fall in a range from about 2:98 to 9:10. That is, forming an insulation layer, which will be described later, enables the electrolyte solution to be avoided from exuding from electrolyte material in the battery electrode, thereby providing effective sealing effect. Therefore, the ratio (in mass ratio) between host polymers and electrolyte solution in polymer gel electrolyte may be determined relatively in favor of battery characteristics.

An example of the above-described additive agent may include trifluoropropylene carbonate for increasing a performance and life of the battery, and reinforcement material may include a variety of fillers.

No particular limitation is intended to the thickness of the positive electrode (thickness of the positive electrode active material layer), and as set forth above, a blending quantity should be determined in consideration of the intended use (such as power output-conscious and energy-conscious) and ion conductivity. Therefore, the thickness of the positive electrode layer (thickness of the positive electrode active material layer) may fall in a values of approximately equal to or greater than 1 μm and equal to or less than 500 μm.

The blending quantity of positive electrode active material, conductivity promoters, binder, polymer electrolyte (such as host polymer and electrolyte solution) and lithium salts in the positive electrode layer should be determined in consideration of the intended use (such as power output-conscious and energy-conscious) and ion conductivity.

[Negative Electrode Layer (Negative Electrode Active Material Layer)]

The negative electrode layer, which can be employed in the presently filed embodiment, includes negative electrode active material. In addition to such composition, conductive promoter agent for increasing the electron conductivity, binder, polymer electrolyte (such as host polymer and electrolyte solution), lithium salts for increasing the ion conductivity and additive agent may also be involved and, when using the polymer gel electrolyte as the polymer electrolyte layer, it may be suffice to include a variety of binders for enabling negative electrode active material particles to be mutually coupled and conductive promoter agent for increasing the electron conductivity whereas no need arises to contain host polymer as raw material of the polymer electrolyte, electrolyte solution and lithium salts. When using aqueous electrolyte as the electrolyte layer, the negative electrode layer may not need to include host polymer as raw material of the polymer electrolyte, electrolyte solution and lithium salts. The compositions, except for those related to the category of the negative electrode active material, are similar to the content described in conjunction with "Positive Electrode Layer" and, hence, description of these compositions is herein omitted.

As negative electrode active material, negative electrode active material that can be also used in a lithium ion battery of an aqueous type may be employed. In particular, such an example may include carbons, metallic compounds, metal oxides, Li-metal compounds, Li-metal oxides (inclusive of lithium-transition metal composite oxides), boron-added carbon and graphite. These compositions may be used in a single kind or in combination of more than two kinds.

As above-described carbons, a variety of carbon materials may be used which include graphite carbon, hard carbon and soft carbon.

As above-described metallic compounds, such samples may include LiAl, LiZn, $Li_3Bi$, $Li_3Cd$, $Li_3Sd$, $Li_4Si$, $Li_{4.4}Pb$, $Li_{4.4}Sn$, $Li_{0.17}C(LiC_6)$. As above-described metal oxides, such samples may include SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO and FeO. As Li-metal compounds, such samples may include $Li_3FeN_2$, $Li_{2.6}Co_{0.4}N$ and $Li_{2.6}Cu_{0.4}N$. As Li-metal oxides (inclusive of lithium-transition metal composite oxides), such samples may include lithium-titanium composite oxides, such as those expressed by $Li_xTi_yO_z$ like $Li_4Ti_5O_{12}$. As above-described boron-added carbons, such examples may include boron-added carbon and boron-added graphite. However, with the presently filed embodiment, no limitation intended to such compositions and a variety of other compositions may be suitably utilized.

Preferably, the boron content in the above-described boron-added carbon lies in a range equal to or greater than 1 mass % and equal to or less than 10 mass % and no limitation is intended to such content. Preferably, carbons are selected from crystalline carbon material and amorphous carbon material. Using these compositions makes it possible to take the shape rate at the slope of the above-described profile, providing an ease of detecting voltages of each unit cell layer and bipolar entity and SOC. Here, by the crystalline carbon material is meant the graphite family carbon material, to which the above-described graphite carbon belongs. By the amorphous carbon material is meant the hard carbon family material, to which the above-described hard carbon belongs.

[Electrolyte Layer]

With the presently filed embodiment, electrolyte may be applied to any of (a) polymer gel electrolyte, (b) polymer solid electrolyte or (c) separators (inclusive of nonwoven fabric separator) immersed with these polymer electrolytes or electrolyte solution.

(a) Polymer Gel Electrolyte

No particular limitation is intended to polymer gel electrolyte, which can be employed in the presently filed embodiment, which may suitably employ those that are used as the gel electrolyte layer. Here, by the gel electrolyte is meant the electrolyte with polymer matrix in which electrolyte solution is retained. Also, in the presently filed embodiment, a difference exists between whole solid polymer electrolyte (merely called as polymer solid electrolyte) and gel electrolyte as follows:

Electrolyte formed of whole solid polymer electrolyte, such as polyethylene oxide (PEO), which contains electrolyte solution that is employed in a commonly used lithium ion battery forms gel electrolyte.

Electrolyte formed of a polymer frame with no lithium ion conductivity, such as polyvinylidene fluoride (PVDF), in which electrolyte solution is retained belongs to gel electrolyte.

The ratio of polymer (also, referred to as host polymer or host polymer matrix) to electrolyte solution has a wide range wherein upon supposition that a whole solid polymer electrolyte is composed of polymer of 100% in mass and liquid electrolyte is composed of electrolyte solution of 100% in mass, intermediate product therebetween belongs to gel electrolyte.

No particular limitation is intended to host polymer forming the above described gel electrolyte and a variety of compositions may be utilized. Preferably, these samples may include polyethylene oxide (PEO), polypropylene oxide (PPO), polyethylene glycol (PEG), polyacrylonitrile (PAN), polyvinylidene fluoride-hexafluoropropylene (PVdF-HFP), poly methyl methacrylate (PMMA) and copolymers of these compounds, and solvents may include ethylene carbonate (EC), propylene carbonate (PC), γ-butyrolactone (GBL), dimethyl carbonate (DMC), diethyl carbonate (DEC) and a mixture of these compounds.

No particular limitation is intended to electrolyte solution (electrolyte salt and plasticizer) forming the above-described gel electrode, and a variety of compositions can be utilized. In particular, electrolyte solution may be suffice to be of the type which is employed in a commonly used lithium battery and include at least one kind of lithium salt (electrolyte salt) selected from inorganic acid anion salts, such as $LiPF_6$, $LiBF_4$, $LiClO_4$, $LiAsF_6$, $LiTaF_6$, $LiAlCl_4$, $Li_2B_{10}Cl_{10}$ and LiBOB (lithium bisoxide borate), and organic acid anion salts, such as $LiCF_3SO_3$, $Li(CF_3SO_2)_2N$ and $Li(C_2F_5SO_2)_2N$ (lithium bis perfluoroethylene sulfonylamide: LiBETI), and also may include a composition employing organic solvent (plasticizer), such as an aprotic solvent that includes at least one or more than two kinds of compositions selected from cyclic carbonates, such as propylene carbonate and ethylene carbonate, chain carbonates such as methyl carbonate, methyl ethyl carbonate and diethyl carbonate, ethers such as tetrahydrofuran, 2-methyl tetrahydrofuran, 1,4-dioxiane, 1,2-dimethoxyethane and 1,2-dibuthoxiethane, lactones such as γ-butyrolactone, nitrites such as acetonitrile, esters such as propionic acid methyl, amides such as dimethylformamide, and methyl acetate and methyl formate. However, no such limitation is intended to such compositions.

The ratio of electrolyte solution to such gel electrolyte is not particularly limited and, in view of ion conductivity, preferably lies in a value of approximately equal to or greater than several % in mass and equal to or less than 98% in mass. With the presently filed embodiment, it is particularly effective for gel electrolyte to have a large content of electrolyte solution at the rate equal to or greater than 70% in mass.

Further, with the presently filed embodiment, the amount of electrolyte solution to be contained in gel electrolyte may be adjusted such that electrolyte solution is substantially equalized inside of gel electrolyte and that the concentration of electrolyte solution varies at a declining slope from a central portion toward an outer peripheral portion. The former is preferable because reactivity can be obtained in a further widened range, and the latter is advantageous in that an increased sealing capability can be provided to count an outer peripheral portion of an whole solid polymer electrolyte section to avoid electrolyte solution from exuding. In a case where the concentration of electrolyte solution is caused to decrease at the slope from the central portion toward the outer peripheral portion, it may be preferable for the above-described host polymer to include polyethylene oxide (PEO), polypropylene oxide (PPO) and copolymer of these compounds.

(b) Polymer Solid Electrolyte

No particular limitation is intended to whole solid polymer electrolyte that can be employed in the presently filed embodiment, and a variety of compositions may be employed. In particular, this includes a layer formed of polymer with ion conductivity, and no limitation is intended to materials provided that these exhibit ion conductivity. Examples of whole solid polymer electrolyte may include a variety of solid polymer electrolytes, such as polyethylene oxide (PEO), polypropylene oxide (PPO) and copolymer of these compounds. The solid polymer electrolytes may contain lithium salts for enhancing ion conductivity. Lithium salts may include $LiBF_4$, $LiPF_6$, $LiN(SO_2CF_3)_2$ and $LiN(SO_2C_2F_5)_2$, or mixture of these compounds. However, no limitation is intended to such compounds. Polymer of polyalkylene oxide family, such as PEO and PPO, is easy to dissolve lithium salts such as $LiBF_4$, $LiPF_6$, $LiN(SO_2CF_3)_2$ and $LiN(SO_2C_2F_5)_2$. Also, upon formation of a bridge structure, an excellent mechanical strength is exhibited.

(c) Above-Described Polymer Electrolyte or Separator (Inclusive of Nonwoven Fabric Separator) Impregnated with Electrolyte Solution (Including Electrolyte Salts and Plasticizer)

Electrolyte, which can be employed in the presently filed embodiment and can be impregnated into the separator, may include compositions similar to electrolytes in the above (a) and (b) and electrolyte solution (electrolyte salts and plasticizer) described in conjunction with the above (a), and detailed description of these compositions is herein omitted.

No particular limitation is intended to the above-described separator, and a variety of compositions may be employed. Such an example may include a porous sheet (such as a polyolefin family porous separator) formed of polymer that absorbs and retains the above-described electrolyte. The above-described polyolefin family porous separator, which has a property that is chemically stable with respect to organic solvent, has an excellent effect in suppressing reactivity with electrolyte (electrolyte solution) to a low level.

Materials of such polymer may include polyethylene (PB), polypropylene (PP), a laminated body with a three-layered structure of PP/PE/PP, and polyamide.

The thickness of the above-described separator cannot be univocally defined because a difference in thickness depends on the intended use. In an application to a motor-drive secondary battery for an electric vehicle (EV) and a hybrid electric vehicle (HEV), it is desirable for the separator with a single layer or multiple layers to have a thickness of a value equal to or greater than 4 μm and equal to or less than 60 μm. The presence of the separator with the thickness lying in such a range avoids short-circuiting caused by intrusion of fine particles into the separator and provides a favorable effect of letting a space between the electrodes to be narrowed for the sake of increased power output, resulting in an advantage of enhancements in mechanical strength in the thickness direction and a high power output capability. Also, when using a plurality of batteries that are connected to one another, electrode surface area increases and, hence, it is desirable to use a separator with an increased thickness among those with the thickness in the above-described range in order for the battery to have an increased reliability.

The fine pore diameter of the above-described separator preferably falls in a pore diameter of a value approximately equal to or less than 1 μm (in normal practice, in a pore diameter of approximately several tens nm) at a maximum. With an average diameter of the fine pore of the separator falling in the above-described range, due to a reason in that "shut-down phenomenon" rapidly takes place when the separator melts down due to heat to close the fine pore, an advantage includes increased reliability during abnormal condition with a resultant improvement over heat-resistance. That is, when the battery temperature rises due to overcharging cycle (during abnormal condition), the separator melts down to cause "shut-down phenomenon", which closes the fine pore, to rapidly occur, resulting in an inability for Li ions to pass from the positive electrode (+) of the battery (electrode) to the negative electrode (−) such that no more charging takes place. Thus, overcharging cannot take place, resolving overcharging. This results in a battery with improved heat-resistance (safety) of the battery, while additionally, precluding a thermally fused portion (sealed portion) of a battery outer sheath to be opened due to exuding of gases. Here, an average diameter of the fine pore of the separator is calculated as a mean diameter upon observation of the separator using a scanning electron microscope and statistically processing photographs through an image analyzer.

The above-described separator has a porosity rate that preferably falls in a range equal to or greater than 20% and equal to or less than 50%. With the separator having such a porosity rate falling in the above-described range, drop in power output resulting from resistance in electrolyte (electrolyte solution) and short-circuiting as a result of the fine particles penetrating the pores (fine pores) can be avoided, resulting in an effect of enhancing both the power output and reliability. Here, by the porosity of the separator is meant the value derived as a volume ratio between a density of raw material resin and a density of the separator of a final product.

The amount of electrolyte impregnated to the above-described separator may be varied within a range of a capacity in which electrolyte is retained in the separator. This is due to the fact that since electrolyte is provided with a sealing portion to preclude electrolyte from exuding from the electrolyte layer, the separator can be impregnated with electrolyte within the range available for the electrolyte layer to retain the same.

No particular limitation is intended to the nonwoven fabric separator, for the purpose of holding electrolyte, which can be manufactured by looping fibers into a sheet. Also, use may be made of a spunbond that can be obtained by fusing the fibers with respect to one another with application of heat.

That is, an example of the nonwoven fabric separator may include a sheet-like member that is fabricated by arraying the fibers in web (thin cotton) shape or mat shape by a suitable method to bond the fibers through application of appropriate adhesive or through a fusing force of the fibers per se. No particular limitation is intended to the above-described adhesive, provided that adequate heat-resistance is provided at temperatures during fabrication and use and no reactivity and dissolving between the adhesive and gel electrolyte occurs to be stable, and a variety of other binding materials may be employed. Also, no limitation is intended to the fiber to be used. Examples of the fiber may include a variety of materials such as cotton, rayon, acetate, nylon, polyolefin such as polyester, polypropylene and polyethylene, polyamide and aramid and these materials may be used in a simple form or in mixed state in accordance with the intended use (including a mechanical strength required for the electrolyte layer).

Further, a bulk density of the nonwoven fabric separator may be selected such that the electrolyte-impregnated polymer gel electrolyte is possible to provide adequate battery characteristics, and no limitation is particularly intended to such a bulk density. That is, this is due to the fact that the presence of the nonwoven fabric, having the bulk density that is too high, results in excessive increase in a percentage of non-electrolyte material shared in the electrolyte, causing damage in ion conductivity of the electrolyte layer.

Also, the nonwoven fabric may preferably have a porosity rate of a value equal to or greater than 50% and equal to or less than 90%. With the porosity rate being less than 50%, deterioration occurs in an ability of holding electrolyte and with the porosity exceeding 90%, inadequate strength results in. Additionally, the nonwoven fabric may have the same thickness as that of the separator preferably in a range equal to or greater than 5 µm and equal to or less than 200 µm and, more preferably, in a range equal to or greater than 10 µm and equal to or less than 100 µm. With the thickness less than 5 µm, deterioration occurs in ability of holding electrolyte and with the thickness exceeding 200 µm, resistance increases.

Moreover, the electrolyte layers related to the above (a) to (c) may be used in combination within a single battery.

Besides, although polymer electrolyte may be incorporated in the electrolyte layer, the positive electrode active material layer and the negative electrode active material layer, identical polymer electrolyte may be used or different polymer electrolyte may be used for each layer.

By the way, host polymer for polymer electrolyte to be preferably used at the present day includes polyether family polymer such as PEO and PPO. For this reason, inadequate oxidation resistance appears at the positive electrode under a condition at high temperatures. Accordingly, when using positive electrode agent with high oxidation/reduction potential that is commonly employed in a lithium ion battery of a liquid type, it is preferable for the negative electrode to have a capacity smaller than that of the positive electrode opposing through the polymer electrolyte layer. With the negative electrode having the capacity smaller than that of the opposing positive electrode, it becomes possible to avoid the positive electrode potential from excessive rise at the last stage of a charging cycle. Also, the capacities of the positive electrode and the negative electrode can be derived from manufacturing conditions as theoretical capacities when manufacturing the positive electrode and the negative electrode. The capacities of a finished product may be directly measured with a measuring device.

However, with the negative electrode having the capacity smaller than that of the positive electrode, a probability occurs in which excessive drop occurs in the negative electrode potential to adversely affect durability of the battery and, so, it is necessary to care about charging and discharging voltages. An average charging voltage of a single unit cell (unit cell layer) is set to a proper value in terms of the oxidation/reduction potential of positive electrode active material to be used and care is undertake not to cause deterioration in durability.

No particular limitation is intended to the thickness of the electrolyte layer that forms the battery. However, in order to obtain a bipolar battery that is compact, it is preferable for the thickness of the electrolyte layer to be minimized as small as possible within a range available to enhance the function of electrolyte. The thickness of a general electrolyte layer lies in a range approximately equal to or greater than 5 µm and equal to or less than 200 µm and, more preferably, in a range approximately equal to or greater than 10 µm and equal to or less than 100 µm

[Insulation Layer]

The insulation layer that can be employed in the presently filed embodiment is formed on a periphery of each electrode for the purpose of avoiding the occurrence of contact between the adjacent current collectors inside the battery and the occurrence of short-circuiting caused by small number of misalignments at terminal ends of the stacked electrodes. With the presently filed embodiment, since an exterior of the battery current collector is covered (sealed) with resin group that has a function of the insulation layer, no need arises for a particular insulation layer to be formed, and with the bipolar battery of the presently filed embodiment, no exclusion is intended for an embodiment wherein such an insulation layer is provided on a circumferential periphery of the electrode.

Since a lot of functions required in the insulation layer can be provided by resin group of the presently filed embodiment, materials to be used for the insulation layer may be of the type that has, in addition to insulation, heat-resistance and electrolyte-liquid-resistance under conditions at battery operating temperatures. Such an example may include epoxy resin, rubber, polyethylene, polypropylene and polyamide and, in view of corrosion resistance, chemical resistance, ease of fabrication (capability of forming a film) and economy, epoxy resin may preferably used.

[Positive Electrode and Negative Electrode Tabs]

The terminal plates for the positive electrode and the negative electrode in the presently filed embodiment may be used according to need. That is, depending upon the stack (or wound) structure of the bipolar battery, the electrode terminals may be extracted directly from the outermost current collectors and, in such case, no positive electrode and negative electrode tabs (terminals plates) may be used as shown in FIG. 1.

When using the positive electrode and negative electrode tabs (terminal plates), in addition to the presence of the function of the terminals, these electrode tabs may preferably have a thickness that is made thin as small as possible in view of thin-shaped formation, and due to low mechanical strength present in any of the electrodes, the electrolytes and the current collectors to be stacked, it is desired for these members to have strengths to allow these members to be sandwiched and supported. Additionally, in view of suppressing internal resistances of the electrode tabs, the positive electrode and negative electrode tabs (terminal plates) have a thickness in a range approximately equal to or greater than 0.1 mm and equal to or less than 2 mm.

Materials of the positive electrode and negative electrode tabs (terminal plates) may be of the types that are used in a normal lithium ion secondary battery with no bipolar type. These examples may include aluminum, copper, titanium, nickel, stainless steel (SUS) and alloy of these metals.

As the positive electrode tab (terminal plate) and the negative electrode tab (terminal plate), the same material may be employed or different materials may be employed.

Also, the positive electrode and negative electrode tabs (terminal plates) may be made of different materials that are laminated in multiple layers.

[Positive Electrode and Negative Electrode Leads]

As the positive electrode and negative electrode leads (that may be included in component parts of a battery module described latter) to be available for use in the presently filed embodiment, a variety of leads can be employed which are of the types that are used in the normal polymer lithium ion battery with no bipolar type set forth above. Also, portions to be extracted from the battery outer sheath (battery case) may be preferably covered with heat contraction tube with heat-resistance insulation not to let these portions to be brought into contact with peripheral equipment or wirings to cause electric leakage to adversely affect products (such as automobile component parts, especially electronic equipment).

[Detection Tab and Resin Group (Outer Sheath and Insulation)]

The detection tabs and the resin group for use in the presently filed embodiment have been already discussed above and, so, detailed description of these components is herein omitted.

By the way, the bipolar battery of the presently filed embodiment preferably has application to a vehicle drive power supply (inclusive of an auxiliary power supply), which is required to have a high energy-density and high power output density, as a power supply with a large capacity of an electric vehicle (EV), a hybrid electric vehicle (HEV), a fuel cell powered vehicle (FCV) and a hybrid fuel cell powered vehicle (HFCV). In such application, a plurality of bipolar batteries of the presently filed embodiment may be structure to form a battery. That is, using at least two or more than two bipolar batteries, especially bipolar type polymer ion secondary batteries, of the presently filed embodiment provides a battery module that is formed by using at least one of connecting method among parallel connection, series connection, parallel-series connection and series-parallel connection, and additionally, the formation of the battery enables to provide a power supply module with a high capacity and high power output. For this reason, it becomes possible for the power supply module to comply with specific requirements for a battery capacity and power outputs for each application purposes at a relatively low cost. These points are described below more in detail.

Next, a method of manufacturing a bipolar battery of the presently filed embodiment is described. Of course, such a manufacturing method is not particularly limited and a variety of methods can be suitably employed.

(1) Application of Positive Electrode Composition

First, an appropriate current collector is prepared. In normal practice, positive electrode composition is obtained in the form of slurry (positive electrode slurry) and coated to one surface of the current collector.

Positive electrode slurry includes solution containing positive electrode material. As other constituents, slurry arbitrarily contains conductive promoter agent, binder, polymerization initiator, electrolyte raw material (such as solid electrolyte polymer or host polymer, and electrolyte solution), supporting salt (lithium salt), and slurry viscosity adjustor solvent. That is, positive electrode slurry can be prepared, in the same manner as that of the lithium ion secondary battery with non bipolar type, by mixing, in addition to positive electrode material, materials at given ratios that arbitrarily include conductivity promoter agent, electrolyte raw material, supporting salt (lithium salt), slurry viscosity adjustor solvent and polymerization initiator.

When using polymer gel electrolyte in the electrolyte layer, it is suffice for polymer gel electrolyte to contain a variety of binders for compelling fine particles of positive electrode active material to be mutually coupled, conductivity promoter for increasing electron conductivity, and solvent, and host polymer for raw material of polymer gel electrolyte, electrolyte solution and lithium salt may not be contained. The same aspect applies to a case where use is made of a separator with an electrolyte layer impregnated with electrolyte solution.

An example of polymer material (host polymer of raw material of polymer gel electrolyte or polymer raw material of polymer solid electrolyte) of electrolyte may include PEO, PPO and copolymer of these compounds, and it may be preferable for molecular to have bridging functional group (such as carbon-carbon double bond). Letting polymer electrolyte to bridge through the use of such bridging functional group provides improvement over mechanical strength.

Positive electrode active material, conductivity promoter agent, binder and lithium salt may include compounds set forth above.

Polymerization initiator may be chosen in accordance with compounds to be polymerized. Photo polymerization initiator may include benzyldimethyl-ketal, and heat polymerization initiator may include azobisisobutyronitrile.

Solvent such as NMP is chosen in accordance with a kind of positive electrode slurry.

The amount of positive electrode active material, lithium salt and conductivity promoter to be added may be adjusted in dependence on the purpose of the bipolar battery, and these compositions may be added at the amount that is commonly employed. The amount of polymerization initiator to be added is determined in accordance with the number of bridging functional groups to be contained in polymer material. Normally, such an amount may lie in a range approximately equal to or greater than 0.01% in mass and equal to or less than 1% in mass.

(2) Formation of Positive Electrode Layer

The current collector, applied with positive electrode slurry, is dried, removing contained solvent. Therewithal, depending upon positive electrode slurry, bridging reaction may be promoted to increase mechanical strength of polymer solid electrolyte. Drying may be performed using a vacuum dryer. Drying conditions may be determined in dependence on positive electrode slurry that is applied and, though no univocal definition can be made, drying may be carried out at a temperature equal to or greater than 40° C. and equal to or less than 150° C. for a time period equal to or greater than 5 minutes and equal to or less than 20 hours.

(3) Application of Negative Electrode Composition

Negative electrode composition (negative electrode slurry) containing negative electrode active material is coated to the other surface opposite to the surface on which the positive electrode layer is coated.

Negative electrode slurry is solvent that contains negative electrode active material. As other composition, solvent arbitrarily contains conductive promoter agent, binder, polymerization initiator, electrolyte raw material (such as solid electrolyte polymer or host polymer, and electrolyte solution), supporting salt (lithium salt), and slurry viscosity adjustor solvent. Materials to be used and the amount of materials to be added are similar to those described with reference to an article [(1) Application of Positive Electrode Composition] and, so, description of these matters is herein omitted.

(4) Formation of Negative Electrode

The current collector, applied with negative electrode slurry, is dried, removing contained solvent. Therewithal, depending upon negative electrode slurry, bridging reaction may be promoted to increase mechanical strength of polymer solid electrolyte. Performing such work completes the bipolar battery. Drying may be performed using the vacuum dryer. Drying conditions may be determined in dependence on negative electrode slurry that is applied and, though no univocal definition can be made, drying may be normally carried out at the temperature equal to or greater than 40° C. and equal to or less than 150° C. for the time period equal to or greater than 5 minutes and equal to or less than 20 hours. Performing such drying allows the current collector to be formed with the negative electrode layer (electrode forming section).

(5) Formation of Electrolyte Layer

When using polymer solid electrolyte layer, electrolyte is manufactured by letting raw material polymer of polymer solid electrolyte and lithium salt to be dissolved in solvent such as NMP, adjusting this mixture and hardening adjusted solution.

When using the polymer gel electrolyte layer, raw material polymer gel electrolyte is manufactured by heating/drying host polymer and pre-gel solution composed of electrolyte solution, lithium salt and polymerization initiator while concurrently performing polymerization (promoting bridging reaction).

When using the polymer gel electrolyte layer in which polymer gel electrolyte is held in the nonwoven fabric separator, the polymer gel electrolyte layer is manufactured by letting the separator to be impregnated with pre-gel solution containing host polymer, as raw material for polymer gel electrolyte, and electrolyte solution, lithium salt and polymerization initiator, heating/drying resulting mixture while concurrently performing polymerization (promoting bridging reaction) under inert atmosphere.

When using the polymer solid electrolyte layer in which solid polymer electrolyte is held in the nonwoven fabric separator, the polymer solid electrolyte layer is manufactured by letting the separator to be impregnated with pre-gel solution containing host polymer, as raw material for polymer gel electrolyte, and electrolyte solution, lithium salt and polymerization initiator, heating/drying resulting mixture while concurrently performing polymerization (promoting bridging reaction) under inert atmosphere.

When using the liquid electrolyte layer in which electrolyte solution is held in the separator, the separator may be impregnated with electrolyte solution, and after stacking the separators and the bipolar electrodes prior to impregnating electrolyte solution, each separator may be impregnated with electrolyte solution.

The above solution or pre-gel solution thus prepared is coated onto the above electrode (on the positive electrode and/or the negative electrode), thereby forming an electrolyte layer with a given thickness or a portion thereof (corresponding to an electrolyte layer with a thickness approximately half the thickness of the electrolyte layer). Thereafter, by heating/drying the resulting electrode laminated with the electrolyte layers (films) while concurrently performing polymerization (promoting bridging reaction) under inert atmosphere, the electrolyte has an increased mechanical strength while the electrolyte layers (films) are formed (finished).

In an alternative aspect, separately, an electrolyte layer, which can be stacked between the electrodes, or a portion thereof (corresponding to an electrolyte layer with a thickness approximately half the thickness of the electrolyte layer) are prepared. The polymer gel electrolyte layer (film) composed of polymer gel electrolyte held by the electrolyte layer (film) or the separator is manufactured by coating the above solution or pre-gel solution onto a suitable film such as a polyethylene terephthalate (PET) film and heating/drying resulting sample while concurrently performing polymerization (promoting bridging reaction) under inert atmosphere or by letting a suitable nonwoven fabric separator, such as those made of PP, to be impregnated with the above solution or pre-gel solution, heating/drying resulting sample while concurrently performing polymerization (promoting bridging reaction) under inert atmosphere.

Hardening and heating/drying may be performed using the vacuum dryer (vacuum oven). Heating/drying conditions may be determined in accordance with solution or pre-gel solution and, though no univocal definition can be made, heating/drying may be normally carried out at the temperature equal to or greater than 30° C. and equal to or less than 110° C. for the time period equal to or greater than 0.5 hours and equal to or less than 12 hours.

The thickness of the electrolyte layer (film) can be controlled using a space. When using photo polymerization initiator, this composition may be incorporated into a light-transmitting gap that is irradiated with ultraviolet using an ultraviolet radiating machine so as to enable drying and polymerization to be performed such that polymer inside the electrolyte layer is photo polymerized to promote bridging reaction to form a film. However, it is, of course, to be noted that the presently filed embodiment is not limited to such a method. Radiation polymerization, electron beam polymerization and heat polymerization may be chosen to suit the kind of polymerization initiators.

Further, since the film to be used in the above step is provable to be heated at the temperature of approximately 80° C. during manufacturing process, due to a need for the film to have adequate heat resistance at such a processing temperature and to have no reactivity with solution or pre-gel solution to be peeled off for removal during manufacturing process, the film may preferably include those, which are excellent in a mound releasing capability, such as polyethylene terephthalate (PET) and polypropylene film and the presently filed embodiment is not limited to such compositions.

Incidentally, many probabilities exits wherein the electrolyte layer has a width slightly smaller than a current collector size of the bipolar electrode.

Also, compositions and constituents as well as blending quantities of the above solution and pre-gel solution are to be suitably determined in accordance with the intended use.

Also, since the separator impregnated with electrolyte solution has the same structure as the electrolyte layer to be used in the bipolar battery of aqueous family with no bipolar type and can be manufactured through various manufacturing methods, such as a method of letting the separator, impregnated with electrolyte, to be sandwiched between the bipolar electrodes for stacking the same and a vacuum liquid pouring method, detailed description of the same is herein omitted.

(6) Stack between Bipolar Electrodes and Electrolyte Layers

In a case of the bipolar electrode with one surface or both surfaces formed with the electrolyte layer (film), a resulting electrode is sufficiently heated and dried under highly evacuated condition and the resulting electrode formed with the electrolyte layer (film) is cut into plural pieces of electrodes each with a suitable size whereupon the electrodes as a result of cutting are directly laminated, preparing a bipolar battery body (electrode stack body).

In a case where the bipolar electrode and the electrolyte layer (film) are separately formed, the bipolar electrode and the electrolyte layer (film) are sufficiently heated and dried under highly evacuated condition and the bipolar electrode and the electrolyte layer (film) are cut into plural pieces of bipolar electrodes and electrolyte layers (films), respectively, each with a suitable size. Then, the bipolar electrodes and the electrolyte layers (films) as a result of cutting are directly laminated in a given number of sheets, preparing a bipolar battery body (electrode stack body).

The number of stacks of the above electrode stack bodies is determined in consideration of battery characteristics required for the bipolar battery. Also, the electrode, in which the current collector is formed with only the positive electrode layer, is located on the outermost layer of the positive electrode side. The electrode, in which the current collector is formed with only the negative electrode layer, is located on the outermost layer of the negative electrode side. In view of precluding moisture from entering the interior of the battery, step of obtaining the bipolar battery, by laminating the electrodes and the electrolyte layers (films) or by laminating the electrodes formed with the electrolyte layers (films), may be preferably carried out under inert atmosphere. The bipolar battery may be prepared under argon atmosphere or nitrogen atmosphere.

(7) Potting of Resin Group (Finishing of Battery)

The positive electrode tab and the negative electrode tab are jointed to both the outermost current collectors of the battery stack body (battery element), respectively, at the needs. Further, the positive electrode lead and the negative electrode lead are jointed (electrically connected) to the positive electrode tab and the negative electrode tab and, then, extracted (this step may be carried out during a stage in which the battery module is assembled). No particular limitation is intended to methods of jointing the positive electrode tab, the positive electrode lead, the negative electrode tab and the negative electrode lead and an ultrasonic welting method with a low jointing temperature may be preferably used for such purposes. But, no limitation is intended to such a welding method and various other jointing methods may be preferably utilized.

The battery stack body (battery element) with tabs being mounted is set into a mould, which is designed to enable the formation of battery structures with various structural features of the embodiments shown in FIGS. 1, 2 and 5, and resin material forming resin group is poured into a space around a periphery of the stacked battery element whereupon hardening of resin group is carried out to seal the battery element, thereby finishing the bipolar battery. When manufacturing the bipolar battery, the presence of step of pouring resin material, forming resin group, (such as melted resin or resin material with two liquid mixture type) into a space around an exterior of the battery stack body (battery element) after laminating internal electrodes enables gas tightness of the battery to be enhanced.

The above-described resin material may be of two liquid mixture type that takes a liquid form at a room temperature during mixing and is hardened after an elapse of time and further include a type that uses moisture in air for hardening resin or a type that utilizes application of heat. The battery existing up to these days has a gas-tight structure that is complicated and, in contrast, the method of utilizing liquid resin is particularly excellent in view of the gas-tight structure that can be extremely and simply maintain. In order to have further enhanced gas-tightness, a polymer/metal composite film can be further applied to the exterior of the battery covered with potting material. In an application of the battery at a site which is especially high in humidity, the use of double coatings through this potting and polymer/metal composite film is effective, but no limitation is intended to such method.

By the way, with the presently filed embodiment, at least two or more than two bipolar batteries set forth above can be connected in series or parallel (in series-parallel connection), thereby forming a battery module. This makes it possible for fundamental bipolar batteries to be combined in compliance with requirements for a variety of capacities and output voltages for various vehicles. This results in a capability of providing an ease of design selection among power outputs, and no need arises for designing and producing bipolar batteries different for various vehicles while enabling mass production of bipolar batteries that forms fundamental elements.

Further, with the battery module of the presently filed embodiment, a structure may be provided wherein the bipolar battery, which has heretofore been discussed above, is connected in parallel with a battery that is comprised of lithium ion secondary batteries, with no bipolar type, which include a plurality of unit cells each of which includes a positive electrode whose current collectors have both surfaces formed with positive electrode material and a negative electrode whose current collectors have both surfaces formed with negative electrode material whereupon the lithium ion secondary batteries are connected in the same number of pieces as the number of stack of such bipolar batteries to provide the same voltage. That is, the bipolar battery forming the battery module may include a mixed system composed of the bipolar battery of the presently filed embodiment and a lithium ion secondary battery with no bipolar type. This enables a battery module, which can compensate respective weak points through combination of the bipolar battery with a high regard for power output and a commonly used lithium ion secondary battery with a high regard for energy, to be formed, resulting in reduction in weight and size of the battery module. The proportion of the bipolar batteries and the batteries with no bipolar type to be combined in the mixed system is determined in accordance with safety performance and power output performance required as the battery module.

Furthermore, a battery module may be manufactured by connecting the above-described bipolar batteries in series and parallel to form a first battery unit and connecting secondary batteries, except for the bipolar batteries that provides the same voltage as the terminal voltage of the first battery unit, in series and parallel to form a second battery unit whereupon the first battery unit and the second battery unit are connected in parallel.

Hereinafter, such a battery module is described in connection with the accompanying drawings.

FIG. 6A is a plan view of the battery module of the presently filed embodiment; FIG. 6B is a bottom view of the battery module as viewed in an X-direction of FIG. 6A; and FIG. 6C is a right side view of the battery module as viewed in a Y-direction of FIG. 6B, with any of the drawing figures showing an interior of the module transparent through an outer case.

Figure 6C:
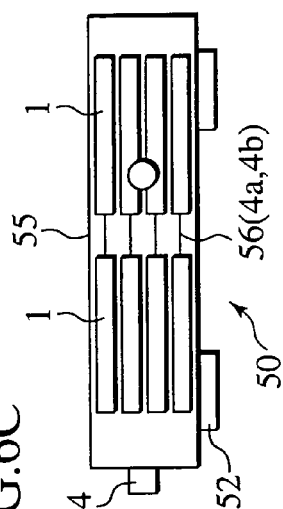
FIG. 6C is a right side view as viewed in a Y-direction of FIG. 6B and transparently illustrating the interior of the module through the outer case, in the presently filed embodiment.
Figure 6B:
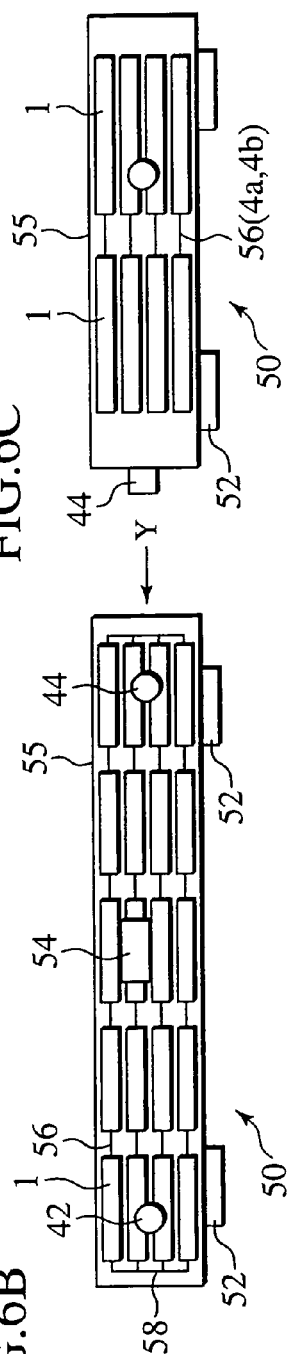
FIG. 6B is a bottom view as viewed in an X-direction of FIG. 6A and transparently illustrating the interior of the module through the outer case thereof, in the presently filed embodiment.

Typically, as shown in FIGS. 6A to 6C, in order to form a battery module 50, five sheets of bipolar batteries are connected in parallel through a connecting bar 56 and electrode tabs of the five sheets of bipolar batteries 1 connected in parallel are further connected in series in two sheets whereupon the bipolar batteries are stacked in four layers whereupon the bipolar batteries are connected in parallel through a connecting bar 58 and accommodated in a battery case 55 made of metal. Thus, by connecting arbitrary number of bipolar batteries 1 in series and parallel, it becomes possible to provide the battery module 50 that can comply with desired electric current, voltage and capacity.

The battery module 50 includes a positive electrode terminal 42 and a negative electrode terminal 44 that protrude from one side of the battery case 55 made of metal and that are connected to respective connecting bars 56 and respective electrode terminals, which result from connecting the batteries in series and parallel, through electrode terminal leads 59.

Further, in order to monitor the battery voltages (of respective unit cell layers, and further voltage between terminals of the bipolar battery), the battery module 50 is provided with a voltage detection tab terminal 54 that is disposed on the side surface of the battery casing 55, made of metal, on which the positive electrode terminal 42 and the negative electrode terminal 44 are located.

And, all of the voltage detection tabs 4' of the respective batteries 1 are connected to the voltage detection tab terminal 54 through the voltage detection lead.

Furthermore, mounted to a bottom of the battery case 55 is an outer resilient body 52 that, when laminating the battery modules 50 in multiple stacks to form the battery by, establishes a distance between the battery modules for thereby enabling improvements over vibration proof, impact-resistance, insulation and heat radiation property of the battery.

Incidentally, the battery module 50 may be provided, in addition to the above-described voltage detection tab terminal 54, a variety of measuring equipment and control equipment. Additionally, the electrode tabs (4a, 4b) of the bipolar battery 1 and the voltage detection tabs 4' and the voltage detection lead 53 may be connected to one another by ultrasound welding, thermal welding, laser welding, electron beam welding, rivets, or using technique of caulking, through the connecting bars 56, 58. Moreover, the connecting bars 56, 58 and the electrode terminal leads 59 may be connected together by using ultrasound welding, thermal welding, laser welding or electron beam welding, and no particular limitation is intended to such a method.

Even though the above-described resilient body 52 may employ the same material as that of resin group employed in the battery of the presently filed embodiment, no particular limitation is intended to such material.

Incidentally, since component elements of other battery modules are not particularly restricted and may be suitably applied with the same component elements as those of the battery module employing an existing lithium ion secondary battery with no bipolar type while making it possible to utilize component parts of a variety of battery modules and associated manufacturing technology, description of these points is herein omitted.

Next, connecting at least two or more than two battery modules set forth above in series, parallel or series and parallel to form a combined battery makes it possible to comply with requirements for a battery capacity and power output for each intended use at a relatively low cost without newly manufacturing the battery module. That is, the battery of the presently filed embodiment has a feature in that at least two or more than two battery modules (including a structure that is comprised of only the bipolar batteries of the presently filed embodiment and, in addition, a structure that is comprised of the bipolar battery of the presently filed embodiment and the other bipolar battery with no bipolar type) are connected in series, parallel and compositely series and parallel, and manufacturing fundamental battery modules to be combined to form the combined battery enables tuning of a specification of the battery module. This results in no need for manufacturing a lot of battery modules, enabling reduction in manufacturing cost of the battery module.

Figure 7A:
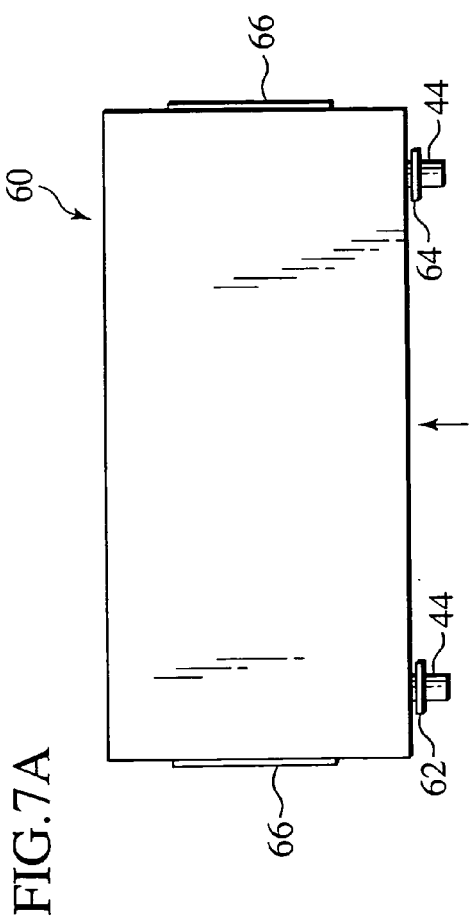
FIG. 7A is a plan view of a combined battery using the battery module of the presently filed embodiment.

FIG. 7A is a plan view of the combined battery of the presently filed embodiment; FIG. 7B is a bottom view of the combined battery as viewed in an X-direction of FIG. 7A; and FIG. 7C is a right side view of the combined battery as viewed in a Y-direction of FIG. 7B.

Figure 7C:
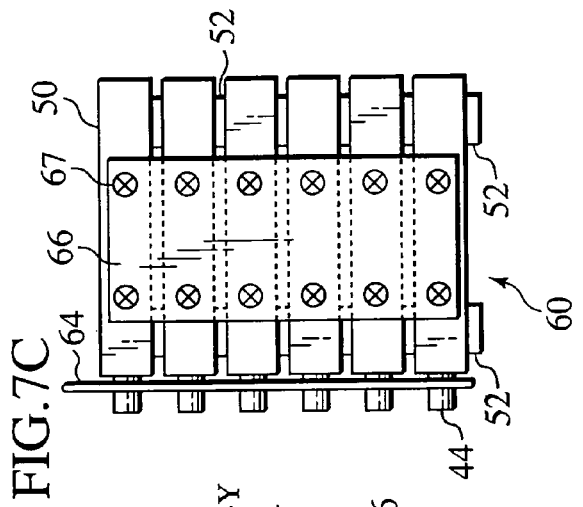
FIG. 7C is a right side view as viewed of the combined battery in the Y-direction of FIG. 7B.
Figure 7B:
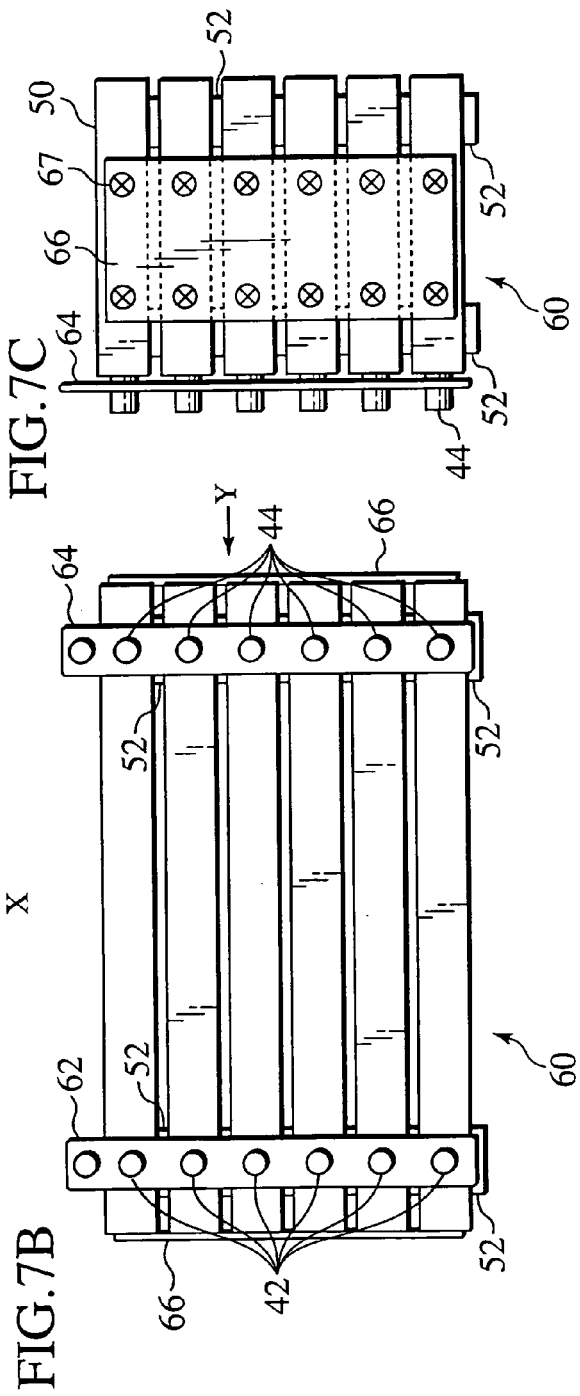
FIG. 7B is a bottom view of the combined battery as viewed in the X-direction of FIG. 7A.

As shown in FIGS. 7A to 7C, typically, in order to connect six rows of the battery modules 50 in parallel to one another to form the combined battery 60, the positive electrode terminals 42 and the negative electrode terminals 44 of the battery modules 50 encompassed in the housings of each battery case 55 are electrically connected to one another, respectively, using a battery positive electrode connecting plate 62 and a battery negative electrode connecting plate 64 which have an outer positive electrode terminal and an outer negative electrode terminal, respectively. Further, connected to respective fixture screw threaded bore portions (not shown) of both side surfaces of the respective battery module cases 55 by fixture screws 67 are connecting plates 66, formed with opening portions in correspondence with such fixture screw threaded bore portions, through which the respective battery modules 50 are mutually connected. Furthermore, the positive electrode terminals 42 and the negative electrode terminals 44 of the respective battery modules are protected with positive electrode and negative electrode insulation cavers and distinguished using suitable colors, i.e., red color and blue color.

Thus, the combined battery formed of plural battery modules connected in series and parallel is possible to be repaired through replacement of only troubled battery module even when failure occurs in part (such as the troubled battery module) of the combined battery.

Besides, a vehicle of the presently filed embodiment is installed with the above-described battery module and/or the above-described combined battery. This allows the batteries to be light in weight and small in structure for thereby complying requirements of the vehicle that is needed to provide an increased spacing. Minimizing the spacing shared by the battery achieves to provide a vehicle with light in weight.

Figure 8:
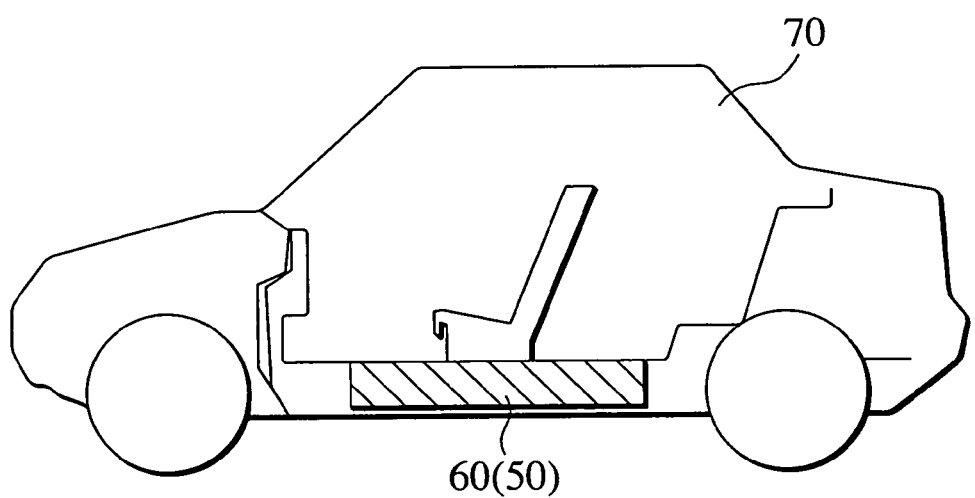
FIG. 8 is a typical view illustrating an electric vehicle on which the combined battery or the like is installed, in the presently filed embodiment.

FIG. 8 is a typical view illustrating the electric vehicle on which the combined battery and/or the battery module of the presently filed embodiment is installed.

In order for the combined battery 60 to be installed on the vehicle (such as an electric vehicle), the combined battery 60 is installed on the electric vehicle 70 on a vehicle body central area at a position beneath a seat. The presence of the combined battery 60 installed in the position beneath the seat allows a vehicle space and a trunk room to be widened. Of course, the position in which the battery is installed includes not only the position beneath the seat but also an under-floor of the vehicle, a position backward of the seat, a lower area of a rear trunk room and an engine room in front of the vehicle.

Incidentally, the presently filed embodiment may employ not only the combined battery 60 but also the battery module 50 in accordance with the intended uses or may include a combination of these batteries of the combined battery 60 and the battery module 50. Also, the vehicle on which the combined battery 60 and the battery module 50 of the presently filed embodiment can be installed as a drive power supply or an auxiliary power supply preferably includes the above-described electric vehicle, fuel cell powered vehicle and hybrid vehicle, but the presently filed embodiment is not limited to such applications.

EXAMPLES AND COMPARATIVE EXAMPLE

The presently filed embodiment is described below in detail with reference to respective Examples and a Comparative Example.

Example 1

First, Example 1 is described in detail. The specification or the like is shown in Tables 1 and 2 listed below.

⟨<Formation of Electrode>⟩

1. Formation of Positive Electrode

Positive electrode slurry was prepared by mixing materials, including spinel $LiMn_2O_4$ [85% in mass] with a mean grain diameter of 2 μm that was Li—Mn family composite compound as positive electrode material, acetylene black [5% in mass] as conductive promoter agent, polyvinylidene fluoride (PVDF) [10% in mass] as binder and N-methyl-2-pyrolidone (NMP) (since NMP is removed by volatilizing when drying the electrode and forms no forming material, an appropriate amount of NMP was added to provide proper slurry viscosity), at the above ratio (indicative of ratio converted in terms of constituents except for slurry viscosity adjustor solvent).

The above positive electrode slurry was applied onto one surface of a SUS foil (with a thickness of 20 μm), forming a current collector, which in turn was placed in an evacuated oven, and dried at 120° C. for 10 minutes, thereby forming a positive electrode with a dried thickness of 20 μm.

In addition, as an outermost positive electrode, the above positive electrode slurry was applied onto one surface of a SUS foil (with a thickness of 40 μm), forming a positive electrode tab, which in turn was placed in an evacuated oven, and dried at 120° C. for 10 minutes, thereby forming a positive electrode with a dried thickness of 20 μm.

2. Formation of Negative Electrode

Materials composed of hard carbon [90% in mass] with a mean grain diameter of 4 μm that was amorphous carbon material serving as negative electrode active material, PVDF [10% in mass] serving as binder and NMP (added at an appropriate amount to provide a proper slurry viscosity) serving as slurry viscosity adjustor solvent were mixed at the above ratio (indicative of ratio converted in terms of constituents except for slurry viscosity adjustor solvent), thereby preparing negative electrode slurry.

The above negative electrode slurry was applied onto the other surface of the SUS foil, formed with the positive electrode, which in turn was placed in the evacuated oven, and dried at 120° C. for 10 minutes, thereby forming a negative electrode with a dried thickness of 20 μm.

In addition, for the formation of an outermost negative electrode, the above negative electrode slurry was applied onto one surface of a SUS foil (with a thickness of 40 μm), forming a negative electrode tab, which in turn was placed in an evacuated oven, and dried at 120° C. for 10 minutes, thereby forming a negative electrode with a dried thickness of 20 μm.

The presence of the positive electrode and the negative electrode formed on both surfaces of the SUS foil, serving as the current collector, respectively, formed a bipolar electrode. Also, a positive electrode and a negative electrode were formed on one surfaces of the positive electrode tab and the negative electrode tab, thereby forming the outermost electrodes.

<Formation of Gel Electrolyte Layer>

An nonwoven fabric (with a porosity: approximately 50%) made of PP with a thickness of approximately 50 μm was used as a separator.

The above separator was impregnated with pre-gel solution composed of copolymer (with copolymer ratio of 5:1 and a weight mean molar quantity of 8000) [5% in mass], a mixture [95% in mass] of electrolyte solution EC+DMC (EC:DMC=1.3 (in volume ratio)) and lithium salt $LiBF_4$ dissolved thereto at 1.0 M, and AIBN [1% in mass with respect to host polymer], and heat polymerization was carried out under an inert atmosphere at 90° C. for one hour, and a gel electrolyte layer formed of gel electrolyte is retained in the nonwoven fabric separator.

<Formation of Battery Stack Body (Battery Element)>

The bipolar electrodes and the outermost electrodes, described above, were disposed in a structure to allow the gel electrolyte layer to be sandwiched between the positive electrode and the negative electrode and laminated to provide a stack structure in ten layers (equivalent to ten cells of unit cell layers; a bipolar battery with 42 V) in combination of the positive electrodes and the negative electrodes as shown in FIG. 1, thereby preparing a battery stack body (battery element).

<Formation of Resin Group (Completion of Bipolar Battery)>

The above battery stack body (battery element) was set in a potting mould (metallic die) that was designed to provide a resin group with a potting thickness of 500 μm, and material (urethane family resin material of the type to be hardened in two liquids) of resin number 1, shown in the Table 1 described below, as resin of the resin group was poured into the mould after suppressing the foaming as less as possible while removing oncoming gas under reduced pressure whereupon such resin material was hardened at a normal temperature to provide a sealing of the battery stack body (battery element). Then, the above mould was removed. This allowed fabrication of a bipolar battery with a stack structure shown in FIG. 1 composed of the battery stack body (battery element) whose exterior was treated with posting with one kind of resin group.

The resulting bipolar battery had the ratio of 1:0.9 between the above negative electrode tab total surface area and the detection tab total surface area (with the detection tab at the outermost portion being removed from calculation because of a structure integral with the tab) and the ratio of 1:5 between a width of the detection tab and a distance between the detection tabs. Incidentally, the current collectors of the bipolar structure were exposed in part to the outside of the resin group, and exposed areas were treated as detection tabs.

Example 2

In this Example, a bipolar battery was fabricated in the same manner as Example 1 except for matters described below, as shown in Tables 1 and 2 listed below.

That is, the bipolar battery of this Example has the same structure as that of Example I except in that for the formation of the outermost positive electrode, the above positive electrode slurry was applied onto one surface of a SUS foil (with a thickness of 40 μm), serving as a current collector, which in turn was placed in an evacuated oven and dried at 120° C. for 10 minutes to form a positive electrode with a dried thickness of 20 μm whereupon a SUS foil (with a thickness of 100 μm), serving as a positive electrode tab, is connected (by vibration welding) to a rear surface of the current collector with no positive electrode formed thereon to provide the outermost positive electrode, and in that, for the formation of the outermost negative electrode, the above-described negative electrode slurry was applied onto one surface of a SUS foil (with a thickness of 40 μm), serving as a current collector, which in turn was placed in an evacuated oven and dried at 120° C. for 10 minutes to form a negative electrode with a dried thickness of 20 μm whereupon a SUS foil (with a thickness of 100 μm), serving as a negative electrode tab, is connected (by vibration welding) to a rear surface of the current collector with no negative electrode formed thereon to provide the outermost negative electrode Additionally, in this Example, as shown in FIG. 2, a bipolar battery was fabricated in the same manner as Example 1 except in that the above-described battery structure body (battery element) was set in a potting mould that was designed to allow the resin group to cover the battery structure body involving exteriors of the positive electrode tab and the negative electrode tab, and material of resin number 1, shown in the Table 1 described below, as resin forming the resin group was poured into the mould after suppressing the foaming as less as possible while removing oncoming gas under reduced pressure whereupon such resin material was hardened at a normal temperature to cause the battery stack body (battery element) to be covered (with potting) with the resin group, thereby fabricating a bipolar battery with a stack structure shown in FIG. 2.

Example 3

In this Example, a bipolar battery was fabricated in the same manner as Example 1 except for matters described below, as shown in Tables 1 and 2 listed below.

That is, the bipolar battery of this Example has the same structure as that of Example I except in that graphite with a mean grain diameter of 2 μm forming crystalline carbon material was used as negative electrode material in place of hard carbon with a mean grain diameter of 4 μm forming amorphous carbon material, in that for the formation of the outermost positive electrode, the above positive electrode slurry was applied onto one surface of a SUS foil (with a thickness of 40 μm), serving as a current collector, which in turn was placed in an evacuated oven and dried at 120° C. for 10 minutes to form a positive electrode with a dried thickness of 20 μm whereupon a SUS foil (with a thickness of 100 μm), serving as a positive electrode tab, was connected (by vibration welding) to a rear surface of the current collector with no positive electrode formed thereon to provide the outermost positive electrode, and in that for the formation of the outermost negative electrode, the above-described negative electrode slurry was applied onto one surface of a SUS foil (with a thickness of 40 μm), serving as a current collector, which in turn was placed in an evacuated oven and dried at 120° C. for 10 minutes to form a negative electrode with a dried thickness of 20 μm whereupon a SUS foil (with a thickness of 100 μm), serving as a negative electrode tab, is connected (by vibration welding) to a rear surface of the current collector with no negative electrode formed thereon to provide the outermost negative electrode Additionally, in this Example, as shown in FIG. 5, a bipolar battery was fabricated in the same manner as Example 1 except in that the above-described battery structure body (battery element) was set in a potting mould that was designed to allow the resin group to cover the battery structure body involving exteriors of the positive electrode tab and the negative electrode tab and to form a gas release configuration as shown in FIG. 5 in a way to provide the resin group with a potting thickness of 1000 μm with respect to a general surface while, as relief valves for respective unit cell layers, portions of the resin group of the respective unit cell layers have areas with a thinner potting thickness than the general surface (with the potting thickness thinner than the general surface by 500 μm), and material of resin number 1, shown in the Table 1 described below, as resin forming the resin group was poured into the mould after suppressing the foaming as less as possible while removing oncoming gas under reduced pressure whereupon such resin material was hardened at a normal temperature to cause the battery stack body (battery element) to be covered (with potting) with the resin group, thereby fabricating a bipolar battery with a stack structure shown in FIG. 5

Example 4

In this Example, a bipolar battery was fabricated in the same manner as Example 3 except for matters described below, as shown in Tables 1 and 2 listed below.

That is, the bipolar battery of this Example has the same structure as that of Example 3 except in that graphite with a mean grain diameter of 2 μm forming crystalline carbon material was used as negative electrode material in place of hard carbon with a mean grain diameter of 4 μm forming amorphous carbon material and that, in place of material of resin 1 shown in Table 1 described below, material (urethane family resin material of the type to be hardened in two liquids) of resin number 2 was used as resin of the resin group.

Example 5

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (epoxy family resin material of the type to be hardened in two liquids) of resin number 3 was used as resin of the resin group.

Example 6

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (olefin family resin material of the type to be hardened in two liquids) of resin number 4 was used as resin of the resin group.

Example 7

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (nylon (polyamide) family resin material of the type to be hardened in two liquids) of resin number 5 was used as resin of the resin group.

Example 8

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (urethane family resin material of the type to be hardened in two liquids) of resin number 6 was used as resin of the resin group.

Example 9

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (olefin family resin material of the type to be hardened in two liquids) of resin number 7 was used as resin of the resin group.

Example 10

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (olefin family resin material of the type to be hardened in two liquids) of resin number 8 was used as resin of the resin group.

Example 11

In this Example, a bipolar battery was fabricated in the same manner as Example 4 except for matters described below, as shown in Tables 1 and 2 listed below.

That is, the bipolar battery of this Example was fabricated in the same manner as that of Example 4 except in that, in place of material of resin 2 shown in Table 1 described below, material (urethane family resin material of the type to be hardened in two liquids) of resin number 9 was used as resin of the resin group.

Comparative Example 1

In this Comparative Example, a bipolar battery was fabricated in the same manner as that of Example 1 except in that, in place of covering the battery element with the resin group as in Example 1, the battery element was encompassed in a waterproof envelope, composed of a polymer-metal composite laminate film, with a thickness of 120 μm. During fabrication, for the purpose of avoiding electrical shortage between respective layers, the laminate sealing was carried out with caution to avoid liquid from exuding.

(Evaluation of Bipolar Battery)

Tests were conducted as described below using the bipolar batteries obtained in Examples 1 to 11 and Comparative Example 1 set forth above in order to evaluate performances of the bipolar batteries resulting from the exposure to the vibrations applied by a vehicle in a case where the bipolar battery of the presently filed embodiment is installed on the vehicle.

<Measurement on Mean Reduction Ratio>

An acceleration pickup was set on substantially middle areas of the respective bipolar batteries obtained in Examples 1 to 11 and Comparative Example 1 set forth above, and vibration spectrums, resulting when subjected to hammering by an impulse hammer, of the acceleration pickup was measured. A setting method was based on JIS B0908 (in Correction Method and Basic Concept for Vibration and Impact Pickup). The measured spectrums were analyzed with an FFT analyzer and converted in dimension of a frequency and acceleration. Resulting frequencies were subjected to equation and smoothing to obtain vibration transfer spectrums. A mean reduction rate was obtained based on surface area ratio of a first peak in this acceleration spectrum plotted in terms of a reference value. By the mean reduction rate is meant that the larger the numeric value, the less will be the vibration.

As the comparative reference value, the measured results of the battery from which the resin group in respective Examples were removed were used. The measured results of resulting mean reduction rates are indicated in Table 2.

Also, a graph plotted with an impact absorbing effect expressed in terms of the vibration spectrum of the acceleration pickup in Examples 1 and Comparative Example 1 is shown in FIG. 4.

<Inspection on Gas-Tightness>

After fabricating respective bipolar batteries in Examples 1 to 11 and Comparative Example 1 as set forth above, heat cycle tests (at −30° C. for one hour and at 70° C. for one hour) were conducted 100 cycles and, then, investigation was conducted for leakage of electrolyte solution in the interior in terms of odor of electrolyte solution and PH test paper. Investigated results on gas-tightness are indicated in Table 2.

In Table 2, a case in which odor of electrolyte solution and electropositive reaction in PH test paper were present was designated with x, and a case with no presence of both factors being confirmed was designated with ○.

<Inspection on Insulation>

After fabricating respective bipolar batteries in Examples 1 to 11 and Comparative Example 1 as set forth above, heat cycle tests (at −30° C. for one hour and at 70° C. for one hour) were conducted 100 cycles and, then, insulation between respective current collectors (foils) was confirmed using an insulation resistance tester. Investigated results on insulation are indicated in Table 2.

In Table 2, a case in which insulation was maintained on test was designated with ○, and a case with short-circuiting occurred was designated with x. Particularly, a resistance value between a tab and an outer sheath inner metal layer was measured using the insulation resistance tester, and those of which insulation resistances exceeding 100 MΩ when applied with 500 V ware designated with ○, and those of which insulation resistances did not meet that condition ware designated with x.

TABLE 1

| | | Resin NO. 1 | Resin NO. 2 | Resin NO. 3 | Resin NO. 4 | Resin NO. 5 | Resin NO. 6 | Resin NO. 7 | Resin NO. 8 | Resin NO. 9 |
|---|---|---|---|---|---|---|---|---|---|---|
| Kind of Resin | | Urethane Family | Urethane Family | Epoxy Family | Olefin Family | Nylon Family | Urethane Family | Olefin Family | Olefin Family | Urethane Family |
| Specific Gravity | | 0.98 | 1.03 | 1.2 | 1 | 1.2 | 1 | 1 | 1 | 1 |
| Hardness | JIS A | 21 | 35 | 90 | 60 | 85 | 5 | 100 | 90 | 10 |
| Dielectric Tangent | 1 kHz 25° C. | 0.038 | 0.07 | 0.005 | 0.005 | 0.005 | 0.02 | 0.004 | 0.0005 | 0.51 |
| Temp. | ° C. | −57 | −35 | 110 | About 100 | About 100 | — | — | — | — |
| Coefficient of Linear Expansion | 1/° C. | $2.2 \times 10^{-4}$ | $2.0 \times 10^{-4}$ | $5.0 \times 10^{-5}$ | $1.0 \times 10^{-4}$ | $1.0 \times 10^{-4}$ | — | — | — | — |
| Coefficient of Cubic Resistivity | $\Omega \cdot cm$ | $1 \times 10^{13}$ | $6 \times 10^{14}$ | $4 \times 10^{16}$ | $1 \times 10^{15}$ | $1 \times 10^{14}$ | — | — | — | — |
| Dielectric Breakdown Strength | kV/mm | 23 | 18 | 25 | 20 | 20 | — | — | — | — |

Note
Normally Hardened Type with Two Liquids in Mixture

TABLE 2

| Example | Structure | Resin Family | Positive Electrode | Negative Electrode | Gas-Tightness | Insulation | Mean Reduction Rate |
|---|---|---|---|---|---|---|---|
| Example 1 | FIG. 1 | Resin NO. 1 | Li-Mn Family | Amorphous Carbon Material | ○ | ○ | 70% |
| Example 2 | FIG. 2 | ↑ | ↑ | ↑ | ○ | ○ | 72% |
| Example 3 | FIG. 5 | ↑ | ↑ | Crystalline Carbon Material | ○ | ○ | 75% |
| Example 4 | ↑ | Resin NO. 2 | ↑ | Amorphous Carbon Material | ○ | ○ | 80% |
| Example 5 | ↑ | Resin NO. 3 | ↑ | ↑ | ○ | ○ | 65% |
| Example 6 | ↑ | Resin NO. 4 | ↑ | ↑ | ○ | ○ | 80% |
| Example 7 | ↑ | Resin NO. 5 | ↑ | ↑ | ○ | ○ | 70% |
| Example 8 | ↑ | Resin NO. 6 | ↑ | ↑ | ○ | ○ | 20% |
| Example 9 | ↑ | Resin NO. 7 | ↑ | ↑ | ○ | ○ | 20% |
| Example 10 | ↑ | Resin NO. 8 | ↑ | ↑ | ○ | ○ | 15% |
| Example 11 | ↑ | Resin NO. 9 | ↑ | ↑ | ○ | ○ | 20% |
| Comparative Example 1 | — | Resin NO. 1 | ↑ | ↑ | X | X | — |

As will be appreciated referring to Tables 1 and 2 indicated above, it is concluded that the batteries of respective Examples of the presently filed embodiment are more excellent in gas-tightness, insulation and vibrating reduction rate than those of Comparative Example 1.

More particularly, as shown in FIG. 4, it is understood that, upon referring to vibration spectrum measurements of the acceleration pickup for Example 1 of the presently filed embodiment with the resin group being used as the outer sheath and Comparative Example with a laminate film being used as the outer sheath without using the resin group, the bipolar battery with the structure of the presently filed embodiment has a more excellent impact absorbing force that a bipolar battery with a general structure on impact absorbing effects (characteristics).

Accordingly, it is concluded that, even when applying the bipolar battery of the presently filed embodiment to a vehicle (with many probabilities in the occurrence of vibrations at a frequency normally equal to or less than 100 Hz), no remarkable vibrations occur. This is due to the fact that, as shown in FIGS. 3A to 3C, the use of the resin group allows an entire periphery of the battery element, especially, the current collector (foil) to be provided with the potting and retained and, so, a spacing between the electrodes can be retained under an equalized pressure condition even when subjected to vibrations, impacts and bulging of the battery resulting from charging and discharging cycles. For this reason, it is discovered that the resin group serves to absorb vibrations and impacts to provide remarkable improvements in vibration proof and impact resistance. Therefore, it is understood that it becomes possible to remarkably reduce damages to the battery element with resultant contribution to a long-term stability in a battery performance. Also, since no resonance occurs in the battery on the vehicle, it is concluded that failure modes such as breakdown of the tab resulting from resonance can be remarkably decreased.

Further, it is discovered that the resin group, among those of respective Examples of the structures of the presently filed embodiment, which has the characteristic of resin, forming the resin group, lying at a resin hardness of JIS A in a range equal to or greater than 5 and equal to or less than 95 and the dielectric-tangent of resin lying in a range equal to or greater than $1.0 \times 10^{-3}$ and equal to or less than $5.0 \times 10^{-1}$ under a temperature range equal to or greater than $-30°$ C. and equal to or less than $80°$ C. at a frequency equal to or greater than 10 Hz and equal to or less than 1 kHz, has a mean reduction rate of a value equal to or greater than 65% and equal to or less than 80% and is effective for remarkably improving vibration proof and impact resistance of the battery. However, since the distance between the collectors can be maintained under the equalized pressure condition even when the characteristic of resin, forming the resin group, among those used in respective Examples of the structures of the presently filed embodiment deviates from the above range, of course, no resonance occurs in the battery installed on the vehicle and such resin can remarkably reduce the failure mode such as breakdown of the tab resulting from resonance.

Furthermore, it can be understood that with respective Examples of the structures of the presently filed embodiment using the outer sheath composed of the resin group, an excellent gas-tightness required for the outer sheath can be obtained and, in addition to an effectiveness of the outer sheath, the presence of the battery element whose entire periphery potted with the resin group enables insulation to be enhanced.

With the structure of the presently filed embodiment set forth above, the bipolar battery can be provided with at least one or more than one series structures each of which is in combination of the positive electrode and the negative electrode and the bipolar battery is enabled to have the detection tabs as sub tabs for monitoring the voltage of each unit cell layer while potting the battery element with at least one or more than one resin groups to allow such resin group to form the outer sheath of the battery.

Therefore, it becomes possible for the bipolar battery of the present invention to exhibit waterproof, heat resistance, gas-tightness and electrolyte-liquid resistance required for the outer sheath of the battery. Moreover, with the presently filed embodiment, outside of an effectiveness of the outer sheath, insulation can be enhanced with the potting made over the entire periphery of the battery element with the resin group.

Moreover, the presence of the battery element, especially, the entire peripheries of the current collectors, covered (by potting) with the resin group results in a capability of retaining the electrodes under an equalized pressure condition. This results in vibration proof for vibrations and absorption and alleviation of impacts to be applied to the battery on the vehicle, enabling remarkable improvements over vibration proof and impact resistance of the battery. Also, due to the absence of the occurrence of resonance of the battery in the vehicle, the failure modes such as breakdown of the tab resulting from resonance can be remarkably reduced (substantially zeroed). At the same time, the use of the detection tab enables the battery to be stably used.

Additionally, when utilizing the battery as a vehicle drive power supply or an auxiliary power supply, even if short-circuiting (liquid junction) due to electrolyte solution is completely precluded using the solid electrolyte, the battery is applied with vibrations and impacts for a long period. For this reason, although there is a fear of the occurrence of short-circuiting resulting from drop-off of the electrolyte, such an issue can be addressed and it becomes possible for the battery to enhance a long-term life, long-term reliability and stability, enabling to provide a power supply with a large capacity at a high reliability.

The entire content of a Patent Application No. TOKUGAN 2003-168213 with a filing date of Jun. 12, 2003 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A bipolar battery comprising:
a bipolar electrode provided with:
a current collector;
a positive electrode layer formed on one surface of the current collector; and
a negative electrode layer formed on the other surface of the current collector;
an electrolyte layer permitting the bipolar electrode to be sequentially laminated through the electrolyte layer so as to be connected in series to form a stack structure;
a resin portion with which the positive electrode layer, the negative electrode layer and the electrolyte layer are potted substantially entirely in a stacking direction;
a first outermost current collector outside the positive electrode layer that is disposed outermost in the series; and
a second outermost current collector outside the negative electrode layer that is oppositely disposed outermost in the series,
wherein each of the first outermost current collector and the second outermost current collector is 2 to 50 times greater in thickness than the current collector,
wherein at least a part of the current collector to be associated with the positive electrode layer, the negative electrode layer and the electrolyte layer is potted with the resin portion and a residual portion of the current collector is exposed from the resin portion to form an exposed portion, and
wherein the exposed portion of the current collector serves as a voltage detection tab and an output tab.

2. The bipolar battery according to claim 1, wherein the exposed portion of the current collector permits the detection tab to be extendable in any one of a first direction along which an electrode tab of the bipolar battery extends and a second direction different from the first direction.

3. The bipolar battery according to claim 1, wherein the resin portion includes resin with a hardness JIS A falling in a value ranging from 5 to 95.

4. The bipolar battery according to claim 1, wherein the resin portion includes resin with dielectric-tangent in a range equal to or greater than $1.0 \times 10^{-3}$ and equal to or less than $5.0 \times 10^{-1}$ under a temperature range equal to or greater than $-30°$ C. and equal to or less than $80°$ C. at a frequency equal to or greater than 10 Hz and equal to or less than 1 kHz.

5. The bipolar battery according to claim 1, wherein resin of the resin portion is selected from epoxy family resin, urethane family resin, nylon family resin, olefin family resin or combinations thereof.

6. The bipolar battery according to claim 1, wherein the resin portion includes a thinned portion with a thinned potting thickness.

7. The bipolar battery according to claim 6, wherein the thinned portion of the resin portion is formed in correspondence with the electrolyte layer.

8. The bipolar battery according to claim 1, wherein the positive electrode layer includes positive electrode material composed of Li—Mn composite oxides.

9. The bipolar battery according to claim 1, wherein the negative electrode layer includes negative electrode material composed of any one of crystalline carbon material and amorphous carbon material.

10. The bipolar battery according to claim 1, wherein the bipolar battery is sequentially connected in any one of series, parallel and series and parallel in combination to form a battery module.

11. The bipolar battery according to claim 10, wherein the battery module (50) is installed on a vehicle as a power supply.

12. The bipolar battery according to claim 10, wherein the battery module is sequentially connected in any one of series, parallel and series and parallel in combination to form a combined battery.

13. The bipolar battery according to claim 12, wherein the combined battery is installed on a vehicle as a power supply.

14. A bipolar battery comprising:
   a bipolar electrode provided with:
      a current collector;
      a positive electrode layer formed on one surface of the current collector; and
      a negative electrode layer formed on the other surface of the current collector;
   an electrolyte layer permitting the bipolar electrode to be sequentially laminated through the electrolyte layer so as to be connected in series to form a stack structure;
   potting means for potting the positive electrode layer, the negative electrode layer and the electrolyte layer substantially entirely in a stacking direction;
   a first outermost current collecting means outside the positive electrode layer that is disposed outermost in the series; and
   a second outermost current collecting means outside the negative electrode layer that is oppositely disposed outermost in the series,
   wherein each of the first outermost current collecting means and the second outermost current collecting means is 2 to 50 times greater in thickness than the current collector,
   wherein at least a part of the current collector to be associated with the positive electrode layer, the negative electrode layer and the electrolyte layer is potted with the potting means and a residual portion of the current collector is exposed from the potting means to form an exposed portion, and
   wherein the exposed portion of the current collector serves as a voltage detection tab and an output tab.

15. A method of manufacturing a bipolar battery, comprising:
   preparing a bipolar electrode provided with:
      a current collector;
      a positive electrode layer formed on one surface of the current collector; and
      a negative electrode layer formed on the other side surface of the current collector;
   sequentially laminating the bipolar battery through an electrolyte layer so as to provide connection in series;
   potting the positive electrode layer, the negative electrode layer and the electrolyte layer substantially entirely in a stacking direction;
   preparing a first outermost current collector outside the positive electrode layer that is disposed outermost in the series; and
   preparing a second outermost current collector outside the negative electrode layer that is oppositely disposed outermost in the series,
   wherein each of the first outermost current collector and the second outermost current collector is 2 to 50 times greater in thickness than the current collector,
   wherein at least a part of the current collector to be associated with the positive electrode layer, the negative electrode layer and the electrolyte layer is potted with a resin portion and a residual portion of the current collector is exposed from the resin portion to form an exposed portion, and
   wherein the exposed portion of the current collector serves as a voltage detection tab and an output tab.

* * * * *